(12) United States Patent
Kozuki

(10) Patent No.: US 11,699,917 B2
(45) Date of Patent: Jul. 11, 2023

(54) POWER SOURCE CONTROL UNIT

(71) Applicant: DENSO TEN Limited, Kobe (JP)

(72) Inventor: Yasunori Kozuki, Kobe (JP)

(73) Assignee: DENSO TEN Limited, Kobe (JP)

( * ) Notice: Subject to any disclaimer, the term of this patent is extended or adjusted under 35 U.S.C. 154(b) by 233 days.

(21) Appl. No.: 16/703,938

(22) Filed: Dec. 5, 2019

(65) Prior Publication Data

US 2020/0313457 A1    Oct. 1, 2020

(30) Foreign Application Priority Data

Mar. 26, 2019   (JP) .................. 2019-059318

(51) Int. Cl.
*H02J 9/06* (2006.01)
(52) U.S. Cl.
CPC .................. *H02J 9/061* (2013.01)
(58) Field of Classification Search
CPC ........ H02J 9/061; H02J 7/0047; H02J 7/0068; H02J 7/1438; H02J 7/34; H02J 7/1423; H02J 2310/40; H02J 7/1415; H02J 7/36; G01R 31/382
See application file for complete search history.

(56) References Cited

U.S. PATENT DOCUMENTS

| | | | |
|---|---|---|---|
| 2011/0082611 A1* | 4/2011 | Shiba | B60K 6/28 180/65.23 |
| 2015/0162768 A1* | 6/2015 | Okuda | G01R 31/392 320/134 |
| 2020/0003843 A1* | 1/2020 | Kinoshita | H02J 7/0048 |

FOREIGN PATENT DOCUMENTS

| | | | | |
|---|---|---|---|---|
| JP | 2018-182864 A | 11/2018 | | |
| JP | 2018182864 A | * 11/2018 | | H02J 9/06 |
| WO | WO-2018190338 A1 | * 10/2018 | | |

* cited by examiner

*Primary Examiner* — Elim Ortiz
(74) *Attorney, Agent, or Firm* — Oliff PLC

(57) ABSTRACT

A power source control unit is for controlling a switch that makes connection between a first power line and a second power line, a first system load being connected to a first power source through the first power line, a second system load being connected to a second power source through the second power line, wherein the power source control unit includes: an SOC acquisition portion as defined herein; a first SOC determination portion as defined herein; a second SOC determination portion as defined herein; a failure determination portion as defined herein; and a switch control portion as defined herein.

6 Claims, 15 Drawing Sheets

FLOWS OF CURRENTS WHEN
MAIN BATTERY 21 FAILED

POWER SOURCE CONTROL UNIT

CROSS-REFERENCE TO RELATED APPLICATIONS

This application is based on and claims priority under 35 USC 119 from Japanese Patent Application No. 2019-059318 filed on Mar. 26, 2019.

TECHNICAL FIELD

The present invention relates to a power source control unit for controlling connection among power sources.

BACKGROUND ART

An automatic driving system mounted on a vehicle is provided with not only a main battery but also a backup battery in order to be capable of continuing control on the vehicle even after a power source failed. In addition, the automatic driving system is provided with two automatic driving loads. Each of the two automatic driving loads includes a sensor or an ECU used for automatic driving. The main battery supplies power to one of the two automatic driving loads while the backup battery supplies power to the other of the two automatic driving loads. Even when one of the main battery and the backup battery failed, the automatic driving system still can continue the automatic driving.

JP-A-2018-182864 discloses a power supply system provided with two power supply lines supplying power to a vehicle onboard apparatus respectively. The power supply system is provided with a power control unit controlling connection between the two power supply lines. When one of the two power supply lines failed, the power control unit turns OFF a switch connecting the two power supply lines to each other.

However, JP-A-2018-182864 does not specifically disclose a condition for determining whether failure occurred or not in any of the power supply lines.

There is known a technique in which determination as to whether one of two power sources failed or not is made based on a current flowing through a wiring connecting the two power sources to each other in a power supply system provided with the two power sources. However, this technique has a low accuracy in detecting the failure of the power source.

SUMMARY OF INVENTION

The present invention provides a technique in which failure of any of two power sources can be detected with high accuracy in a power supply system provided with the power sources.

A first invention provides a power source control unit for controlling a switch that makes connection between a first power line and a second power line, a first system load being connected to a first power source through the first power line, a second system load being connected to a second power source through the second power line, the unit including an SOC acquisition portion, a first SOC determination portion, a second SOC determination portion, a failure determination portion, and a switch control portion. The SOC acquisition portion acquires an SOC value of the second power source. The first SOC determination portion compares the SOC value acquired by the SOC acquisition portion with a first threshold so as to determine whether the second power source can supply predetermined power to the second system load for a predetermined time or not. The second SOC determination portion determines whether the acquired SOC value has decreased to be lower than a second threshold or not when determination is made by the first SOC determination portion that the second power source can supply the predetermined power for the predetermined time, the second threshold being higher than the first threshold. The failure determination portion determines that the first power source failed when determination is made by the second SOC determination portion that the acquired SOC value is lower than the second threshold. The switch control portion turns OFF the switch when determination is made by the failure determination portion that the first power source failed.

According to the first invention, determination as to whether the first power source failed or not is made based on the temporal change of the SOC value of the second power source. Thus, failure of the first power source can be detected with high accuracy in a power supply system provided with the first power source and the second power source.

A second invention provides a power source control unit according to the first invention, further including a current acquisition portion, and a current determination portion. The current acquisition portion acquires a first power source current value from a current sensor that measures a current flowing through a section between the first power source and a first connection portion in the first power line, the first connection portion connecting the first power line to a wiring connected to the switch. The current determination portion determines whether the second power source is supplying a current to the first power source or not, based on the first power source current value acquired by the current acquisition portion. The failure determination portion determines that the first power source failed when determination is made by the current determination portion that the second power source is supplying the current to the first power source.

According to the second invention, when the second power source is supplying the current to the first power source, determination is made that the first power source failed. By use of the current supplied to the first power source in addition to the temporal change of the SOC value of the second power source, failure of the first power source can be detected with higher accuracy.

A third invention provides a power source control unit according to the second invention, wherein: the current acquisition portion acquires a first load current value from a current sensor which measures a current flowing through a section between the first connection portion and the first system load in the first power line; the current determination portion determines whether the current is being supplied to the first system load or not, based on the first load current value acquired by the current acquisition portion, and determines whether the acquired first load current value is higher than a third threshold or not; the failure determination portion determines that the first system load failed when determination is made by the current determination portion that the current is being supplied to the first system load and the acquired first load current value is higher than the third threshold; and the switch control portion turns OFF the switch when determination is made by the failure determination portion that the first system load failed.

According to the third invention, when the current larger than the third threshold is being supplied to the first system load, determination is made that the first system load failed.

The third invention can detect failure of not only the first power source but also the first system load.

A fourth invention provides a power source control unit according to the third invention, wherein: the current determination portion determines whether the first system load is outputting a current to the first power line, based on the acquired first load current value; the failure determination portion determines that abnormality occurred in the first power line when determination is made by the current determination portion that the first system load is supplying the current to the first power line; and the switch control portion turns OFF the switch when determination is made by the failure determination portion that the abnormality occurred in the first power line.

According to the fourth invention, when the first system load is supplying the current to the first power line, determination is made that abnormality occurred in the first power line. The fourth invention can detect abnormality of not only the first power source but also the first power line.

A fifth invention provides a power source control unit according to the second invention, wherein: the current acquisition portion acquires a second load current value from a current sensor that measures a current flowing through a section between the second system load and a second connection portion in the second power line, the second connection portion connecting the second power line to a wiring connected to the switch; the current determination portion determines whether the current is being supplied to the second system load or not, based on the second load current value acquired by the current acquisition portion, and determines whether the acquired second load current value is higher than a fourth threshold or not; the failure determination determines that the second system load failed when determination is made by the current determination portion that the current is being supplied to the second system load and the acquired second load current value is higher than the fourth threshold; and the switch control portion turns OFF the switch when determination is made by the failure determination that the second system load failed.

According to the fifth invention, when the current larger than the fourth threshold is being supplied to the second system load, determination is made that the second system load failed. The fifth invention can detect failure of not only the second power source but also the second system load.

A sixth invention provides a power source control unit according to the fifth invention, wherein: the current determination portion determines whether the second system load is outputting a current to the second power line or not, based on the acquired second load current value; the failure determination portion determines that abnormality occurred in the second power line when determination is made by the current determination portion that the second system load is outputting the current to the second power line; and the switch control portion turns OFF the switch when determination is made by the failure determination that the abnormality occurred in the second power line.

According to the sixth invention, when the second system load is supplying the current to the second power line, determination is made that the abnormality occurred in the second power line. The sixth invention can detect abnormality of both the first power source and the second power line.

A seventh invention provides a power source control unit for controlling a switch that makes connection between a first power line and a second power line, a first system load being connected to a first power source through the first power line, a second system load being connected to a second power source through the second power line, the unit including a current acquisition portion, a current determination portion, a failure determination portion, and a switch control portion. The current acquisition portion acquires a power source current value from a current sensor that measures a current flowing through a section between the first power source and a first connection portion in the first power line, the first connection portion connecting the first power line to a wiring connected to the switch. The current determination portion determines whether the second power source is supplying a current to the first power source or not, based on the power source current value acquired by the current acquisition portion. The failure determination portion determines that the first power source failed when determination is made by the current determination portion that the second power source is supplying the current to the first power source. The switch control portion turns OFF the switch when determination is made by the failure determination portion that the first power source failed.

According to the seventh invention, when the second power source is supplying the current to the first power source, determination is made that the first power source failed. The seventh invention can detect the failure of the first power source with high accuracy in a power supply system including the first power source and the second power source.

An eighth invention provides a power source control unit according to the seventh invention, further including an SOC acquisition portion, a first SOC determination portion, and a second SOC determination portion. The SOC acquisition portion acquires an SOC value of the second power source. The first SOC determination portion compares the SOC value acquired by the SOC acquisition portion with a first threshold so as to determine whether the second power source can supply predetermined power to the second system load for a predetermined time or not. The second SOC determination portion determines whether the acquired SOC value has decreased to be lower than a second threshold or not when determination is made by the first SOC determination portion that the second power source can supply the predetermined power to the second system load for the predetermined time, the second threshold being higher than the first threshold. The failure determination portion determines that the first power source failed when determination is made by the second SOC determination portion that the acquired SOC value is lower than the second threshold. The switch control portion turns OFF the switch when determination is made by the failure determination portion that the first power source failed.

According to the eighth invention, determination as to whether the first power source failed or not is made based on the temporal change of the SOC value of the second power source. Thus, the eighth invention can detect the failure of the first power source with higher accuracy not only by use of the current supplied to the first power source but also by use of the temporal change of the SOC value of the second power source.

A ninth invention provides a power source control method for controlling a switch that makes connection between a first power line and a second power line, a first system load being connected to a first power source through the first power line, a second system load being connected to a second power source through the second power line, the method including a step a), a step b), a step c), a second d), and a step e). The step a) is to acquire an SOC value of the second power source. The step b) is to compare the acquired SOC value with a first threshold so as to determine whether the second power source can supply predetermined power to the second system load for a predetermined time or not. The step c) is to determine whether the acquired SOC value has decreased to be lower than a second threshold or not when determination is made that the second power source can supply the predetermined power for the predetermined time, the second threshold being higher than the first threshold. The step d) is to determine that the first power source failed when determination is made that the acquired SOC value is lower than the second threshold. The step e) is to turn OFF the switch when determination is made that the first power source failed.

The ninth invention can be used for the first invention.

A tenth invention provides a power source control method for controlling a switch that makes connection between a first power line and a second power line, a first system load being connected to a first power source through the first power line, a second system load being connected to a second power source through the second power line, the method including a step a), a step b), a step c), and a step d). The step a) is to acquire a power source current value from a current sensor that measures a current flowing through a section between the first power source and a first connection portion in the first power line, the first connection portion connecting the first power line to a wiring connected to the switch. The step b) is to determine whether the second power source is supplying a current to the first power source or not, based on the acquired power source current value. The step c) is to determine that the first power source failed when determination is made that the second power source is supplying the current to the first power source. The step d) is to turn OFF the switch when determination is made that the first power source failed.

The tenth invention can be used for the seventh invention.

According to the present invention, it is possible to provide a technique in which failure of any of two power sources can be detected with high accuracy in a power supply system provided with the power sources.

DETAILED DESCRIPTION OF THE INVENTION

Figure 1:
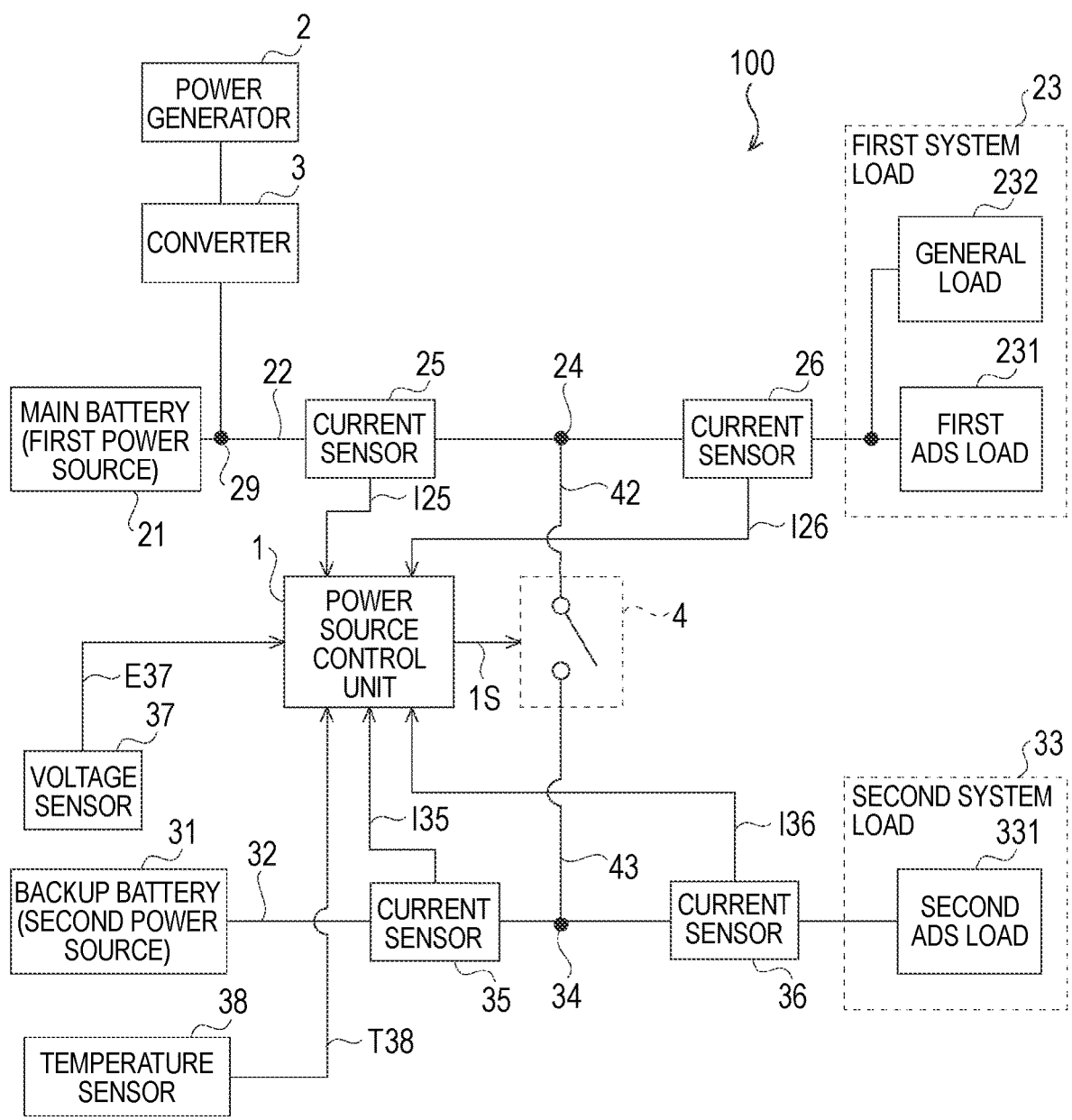
FIG. 1 is a functional block diagram showing the configuration of a power supply system provided with a power source control unit according to an embodiment of the present invention.

An embodiment of the present invention will be described below in detail with reference to the drawings. Identical or equivalent portions in the drawings will be referred to by the same signs respectively and correspondingly, and description thereof will not be repeated.

1. Configuration

[1.1. Configuration of Power Supply System 100]

FIG. 1 is a functional block diagram showing the configuration of a power supply system 100 provided with a power source control unit 1 according to the embodiment of the present invention. Refer to FIG. 1. The power supply system 100 is mounted on a mobile body such as a car.

The power supply system 100 is provided with the power source control unit 1, a power generator 2, a converter 3, a switch 4, a main battery 21, a first power line 22, a first system load 23, a backup battery 31, a second power line 32, and a second system load 33.

The power source control unit 1 detects failure occurring in any of the main battery 21, the first system load 23, the backup battery 31 and the second system load 33. Upon detection of the failure, the power source control unit 1 turns OFF the switch 4 to thereby cut off connection between the main battery 21 and the backup battery 31.

The power generator 2 generates an AC voltage from rotation force of an engine mounted on the mobile body, and converts the generated AC voltage to a DC voltage. The converted DC voltage is supplied to the converter 3. The DC voltage outputted from the power generator 2 is higher than an output voltage of the main battery 21.

The converter 3 receives the DC voltage from the power generator 2, and steps down the received DC voltage. The converter 3 supplies the stepped-down DC voltage to the first power line 22. The converter 3 may step down regenerated power which occurs when the mobile body is decelerated.

The main battery 21 is a first power source in the power supply system 100. For example, the main battery 21 may be a lead-acid battery. The main battery 21 supplies power to the first system load 23, the backup battery 31 and the second system load 33.

The first system load 23 is a device mounted on the mobile body. The first system load 23 operates by the power supplied from the main battery 21. The first power line 22 connects the main battery 21 to the first system load 23. The first power line 22 includes connection portions 24 and 29. The connection portion 24 connects a wiring 42 to the first power line 22. The wiring 42 is connected to one end of the switch 4. The connection portion 29 connects the first power line 22 to the converter 3.

The backup battery 31 is a second power source in the power supply system 100. For example, the backup battery 31 may be a lead-acid battery. The backup battery 31 supplies power to the second system load 33.

The second system load 33 is a device mounted on the mobile body. The second system load 33 operates by the power supplied from the backup battery 31. The second power line 32 connects the backup battery 31 to the second system load 33. The second power line 32 includes a connection portion 34. The connection portion 34 connects a wiring 43 to the second power line 32. The wiring 43 is connected to the other end of the switch 4.

The switch 4 is turned ON/OFF in accordance with a control signal 18 from the power source control unit 1. When the switch 4 is ON, the first power line 22 is connected to the second power line 32. When the switch 4 is OFF, the connection between the first power line 22 and the second power line 32 is cut off.

Failure of the main battery 21 includes normal grounding of the main battery 21. In addition, the failure of the main battery 21 includes grounding through a resistance component exceeding current supply capacity of the converter 3. Failures of the backup battery 31, the first system load 23 and the second system load 33 are also similar or the same. Abnormality of each power line includes a state where the power line is grounded at any place, and a state where the power line is grounded through the resistance component exceeding the current supply capacity of the converter 3.

The power supply system 100 is further provided with current sensors 25 and 26, current sensors 35 and 36, a voltage sensor 37, and a temperature sensor 38.

The current sensor 25 measures a current flowing through a section between the connection portion 24 and the connection portion 29 in the first power line 22. The current sensor 25 supplies a power source current value I25 as a result of the measurement to the power source control unit 1. The current sensor 26 measures a current flowing through a section between the connection portion 24 and the first system load 23 in the first power line 22. The current sensor 26 supplies a load current value I26 as a result of the measurement to the power source control unit 1.

The current sensor 35 measures a current flowing through a section between the backup battery 31 and the connection portion 34 in the second power line 32. That is, the current sensor 35 measures the current flowing through the backup battery 31. The current sensor 35 supplies a current measurement value I35 as a result of the measurement to the power source control unit 1.

The current sensor 36 measures a current flowing through a section between the second system load 33 and the connection portion 34 in the second power line 32. The current sensor 36 supplies a load current value I36 as a result of the measurement to the power source control unit 1.

The voltage sensor 37 measures a terminal voltage of the backup battery 31, and supplies a voltage measurement value E37 as a result of the measurement to the power source control unit 1. The terminal voltage is a potential difference generated between a positive electrode terminal and a negative electrode terminal of the backup battery 31. A wiring through which the voltage sensor 37 can measure the terminal voltage of the backup battery 31 is omitted in FIG. 1.

The temperature sensor 38 measures temperature of the backup battery 31, and supplies a temperature measurement value T38 as a result of the measurement to the power source control unit 1.

[1.2. Configuration of First System Load 23]

Refer to FIG. 1. The first system load 23 includes a first ADS (Automatic Drive System) load 231, and a general load 232.

The first ADS load 231 is a power load which executes at least a portion of controls about movement and stop of the mobile body mounted with the power supply system 100, on behalf of an operator of the mobile body. The first ADS load 231 includes a not-shown sensor or a not-shown ECU (Electronic Control Unit). For example, brake control, accelerator control, direction indicator control, wiper control, parking control, etc. are listed as the controls about the movement and stop of the mobile body. However, the controls about the movement and stop of the mobile body are not limited to the aforementioned listed controls.

The general load 232 is a device such as an air conditioner, an audio device, or a car navigation device. Even when power is not supplied from the main battery 21, the general load 232 does not affect travelling and stop of the mobile body.

[1.3. Configuration of Second System Load 33]

Refer to FIG. 1. The second system load 33 includes a second ADS load 331. The second ADS load 331 is a power load which executes at least a portion of the controls about the movement and stop of the mobile body in a manner similar to or the same as the first ADS load 231, on behalf of the operator of the mobile body.

The second ADS load 331 includes the same electric load as the electric load included in the first ADS load 231. Thus, even when one of the main battery 21 and the backup battery 31 failed, the power supply system 100 can continue the travelling and stop of the mobile body by the power supplied from the not failing battery.

[1.4. Configuration of Power Source Control Unit 1]

Figure 2:
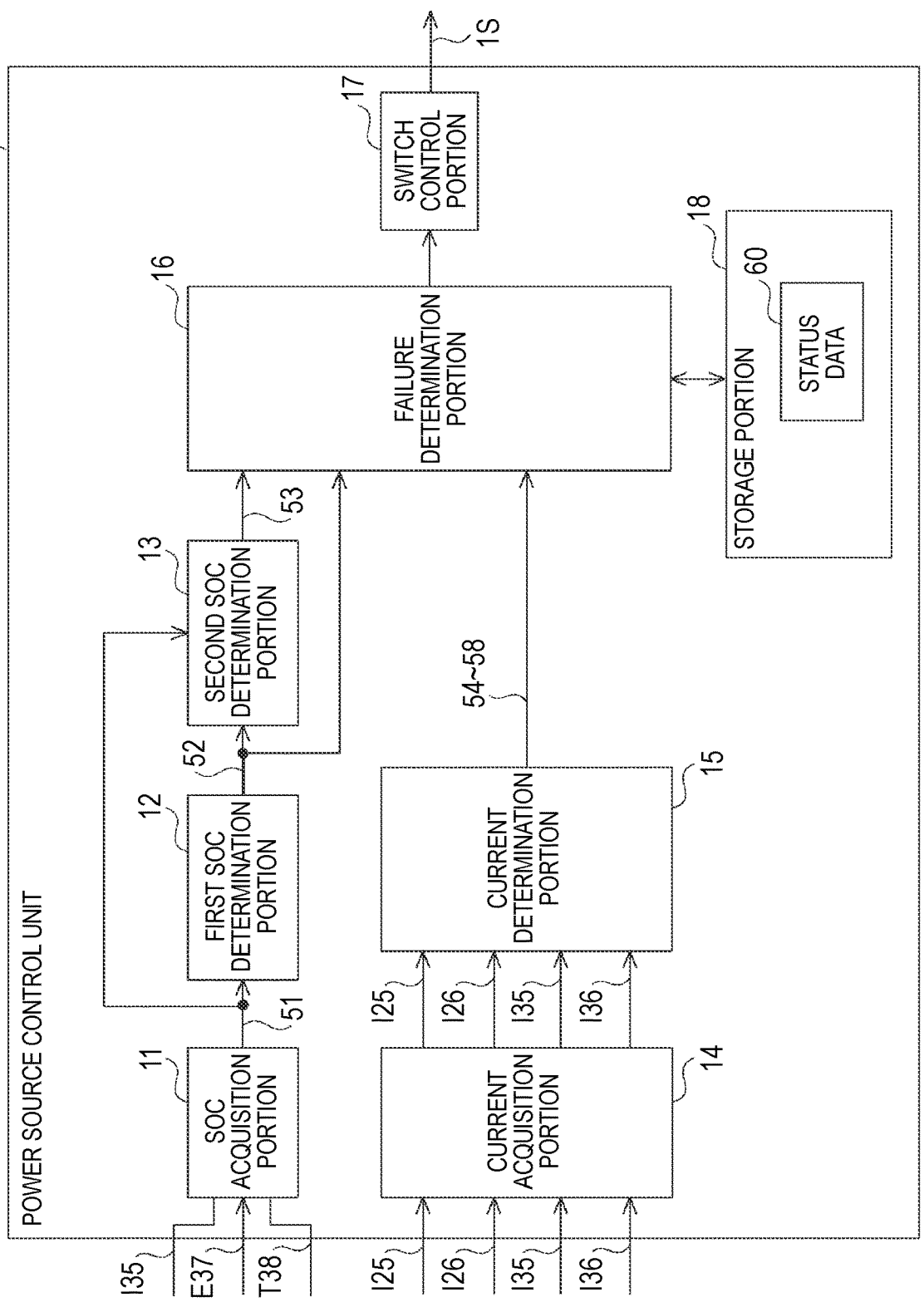
FIG. 2 is a functional block diagram showing the configuration of the power source control unit shown in FIG. 1.

FIG. 2 is a functional block diagram showing the configuration of the power source control unit 1 shown in FIG. 1. Refer to FIG. 2. The power source control unit 1 is provided with an SOC acquisition portion 11, a first SOC determination portion 12, a second SOC determination portion 13, a current acquisition portion 14, a current determination portion 15, a failure determination portion 16, a switch control portion 17, and a storage portion 18.

The SOC acquisition portion 11 receives the current measurement value I35 from the current sensor 35, receives the voltage measurement value E37 from the voltage sensor 37, and receives the temperature measurement value T38 from the temperature sensor 38. The SOC acquisition portion 11 acquires an SOC value 51 of the backup battery 31 by use of the received current measurement value I35, the received voltage measurement value E37 and the received temperature measurement value T38.

The SOC acquisition portion 11 acquires the SOC value 51 with a predetermined frequency. The predetermined frequency is, for example, ten times per minute. Whenever the SOC value 51 is acquired, the SOC acquisition portion 11 outputs the acquired SOC value 51 to the first SOC determination portion 12 and the second SOC determination portion 13.

The first SOC determination portion 12 receives the SOC value 51 from the SOC acquisition portion 11, and executes a first SOC determination process by use of the received SOC value 51. The first SOC determination process is to compare the received SOC value 51 with a preset first threshold so as to determine whether the backup battery 31 can supply predetermined power to the second system load 33 for a predetermined time or not. The first SOC determination portion 12 outputs, to the second SOC determination portion 13 and the failure determination portion 16, a first SOC determination result 52 indicating a result of the first SOC determination process.

The second SOC determination portion 13 receives the value 51 from the SOC acquisition portion 11, and receives the first SOC determination result 52 from the first SOC determination portion 12. When the first SOC determination result 52 indicates that the backup battery 31 can supply the predetermined power to the second system load 33 for the predetermined time, the second SOC determination portion 13 determines execution of a second SOC determination process.

The second SOC determination process is a process of determining whether the received SOC value 51 has decreased to be lower than a preset second threshold or not. The second threshold is higher than the first threshold. The second SOC determination portion 13 outputs a second SOC determination result 53 indicating a result of the second SOC determination process to the failure determination portion 16.

The current acquisition portion 14 acquires the power source current value I25 from the current sensor 25, and acquires the load current value I26 from the current sensor 26. The current acquisition portion 14 acquires the current measurement value I35 from the current sensor 35, and the load current value I36 from the current sensor 36. The current acquisition portion 14 outputs the acquired power source current value I25, the acquired load current value I26, the acquired current measurement value I35, and the acquired load current value I36 to the current determination portion 15.

The current determination portion 15 determines whether the backup battery 31 is supplying a current to the main battery 21 or not, based on the power source current value I25 received from the current acquisition portion 14. The current determination portion 15 outputs current supply information 54 including a result of the determination to the failure determination portion 16.

The current determination portion 15 determines whether the current is being supplied to the first system load 23 or not, based on the load current value I26 received from the current acquisition portion 14. The current determination portion 15 determines whether the received load current value I26 is higher than a preset third threshold or not. The current determination portion 15 outputs first load status information 55 including results of the two determinations to the failure determination portion 16.

The current determination portion 15 determines whether the current is being supplied to the second system load 33 or not, based on the load current value I36 received from the current acquisition portion 14. The current determination portion 15 determines whether the received load current value I36 is higher than a preset fourth threshold or not. The current determination portion 15 outputs second load status information 56 including results of the two determinations to the failure determination portion 16.

The current determination portion 15 determines whether the first system load 23 is outputting a current to the first power line 22 or not, based on the load current value I26 received from the current acquisition portion 14. The current determination portion 15 outputs first power line status information 57 including a result of the determination to the failure determination portion 16.

The current determination portion 15 determines whether the second system load 33 is outputting a current to the second power line 32 or not, based on the load current value I36 received from the current acquisition portion 14. The current determination portion 15 outputs second power line status information 58 including a result of the determination to the failure determination portion 16.

The failure determination portion 16 determines whether failure or abnormality occurred or not in the power supply system 100. When a first failure condition and a second failure condition which will be described later are satisfied, the failure determination portion 16 determines that the main battery 21 failed. The first failure condition is determined based on the first SOC determination result 52 and the second SOC determination result 53. Specifically, when the SOC value 51 is higher than the first threshold, and the SOC value 51 has decreased to be lower than the second threshold, the failure determination portion 16 determines that the first failure condition is satisfied. The second failure condition is determined based on the current supply information 54. Specifically, when the backup battery 31 is supplying the current to the main battery 21, the failure determination portion 16 determines that the second failure condition is satisfied.

When the first load status information 55 indicates that the current is being supplied to the first system load 23 and the load current value I26 is higher than the third threshold, the failure determination portion 16 determines that the first system load 23 failed. When the second load status information 56 indicates that the current is being supplied to the second system load 33 and the load current value I36 is higher than the fourth threshold, the failure determination portion 16 determines that the second system load 33 failed.

When the first power line status information 57 indicates that the first system load 23 is outputting the current to the first power line 22, the failure determination portion 16 determines that abnormality occurred in the first power line 22. When the second power line status information 58 indicates that the second system load 33 is outputting the current to the second power line 32, the failure determination portion 16 determines that abnormality occurred in the second power line 32.

When determining that any of the main battery 21, the first system load 23 and the second system load 33 failed, the failure determination portion 16 sends a notification that the failure occurred to the switch control portion 17. When determining that abnormality occurred at any of the first power line 22 and the second power line 32, the failure determination portion 16 sends a notification that the abnormality occurred to the switch control portion 17.

Upon reception of the notification that the failure or abnormality occurred from the failure determination portion 16, the switch control portion 17 outputs a control signal 1S to turn OFF the switch 4.

The storage portion 18 is a non-volatile storage device. For example, the storage portion 18 may be a flash memory. The storage portion 18 stores status data 60. The status data 60 records information indicating whether each of the main battery 21, the first system load 23 and the second system load 33 failed or not. The status data 60 records information indicating whether abnormality occurred or not in each of the first power line 22 and the second power line 32.

2. Current Paths on Normal Occasion

Current paths in a case where the power supply system 100 is operating normally will be described. The case where the power supply system 100 is operating normally expresses a state in which the main battery 21, the first system load 23, the backup battery 31 and the second system load 33 do not fail, and abnormality does not occur in the first power line 22 and the second power line 32.

(Paths of Current Outputted from Converter 3)

Figure 3:
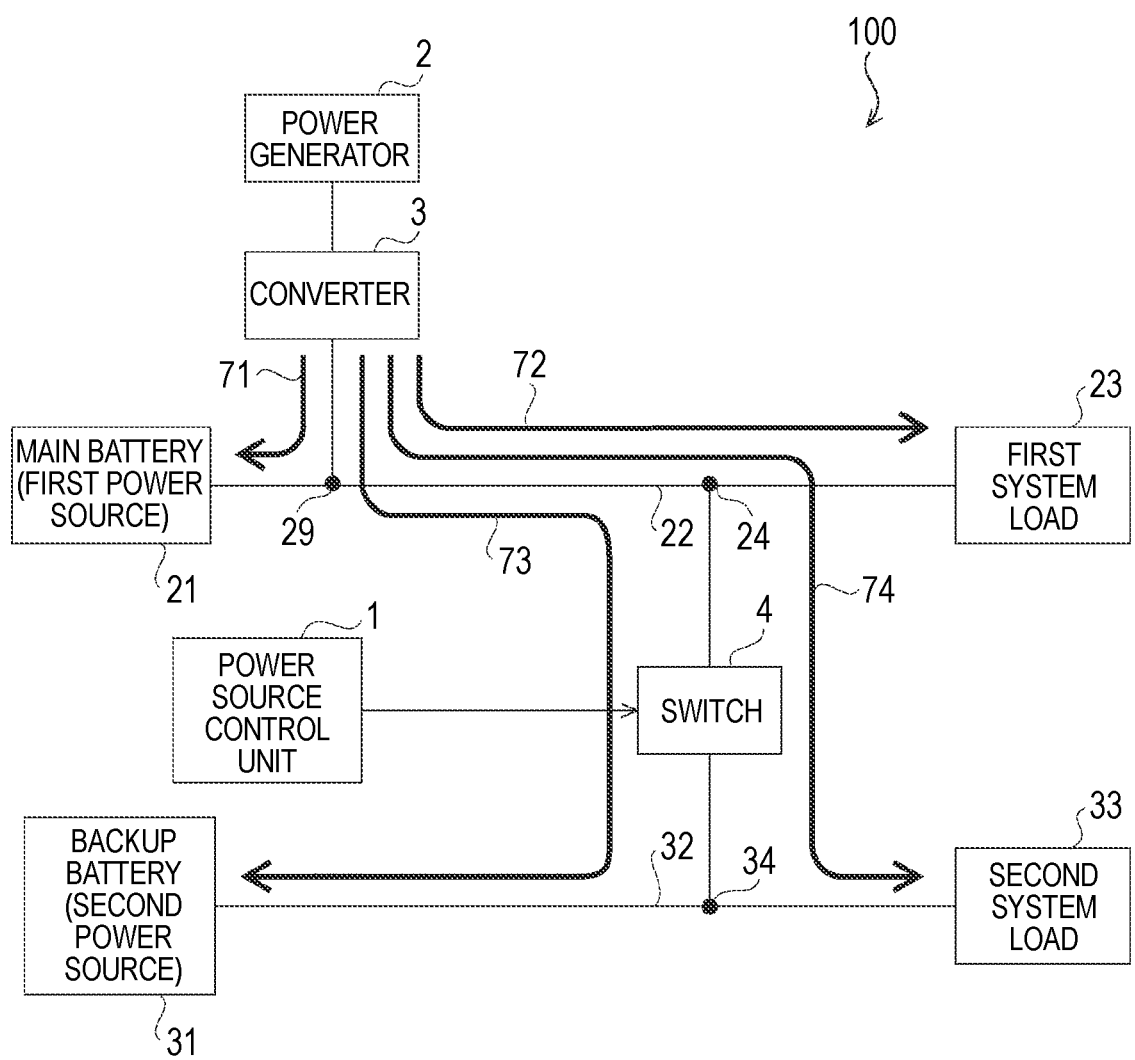
FIG. 3 is a diagram showing an example of paths of a current outputted from a converter shown in FIG. 1.

FIG. 3 is a diagram showing an example of paths of a current outputted from the converter 3 shown in FIG. 1. The respective sensors shown in FIG. 1, the wirings relevant to the respective sensors, the first system load 23, and the second system load 33 are omitted in FIG. 3.

Refer to FIG. 3. When the power generator 2 is generating power, the converter 3 steps down a first DC voltage received from the power generator 2 to a second DC voltage. The first DC voltage is, for example, 48 (V), and the second DC voltage is, for example, 12 (V). The converter 3 outputs a DC current together with the second DC voltage to the first power line 22. The DC current will be hereinafter simply described as "current".

The main battery 21 receives the current flowing through a path designated by an arrow 71 during charging. The arrow 71 extends from the converter 3 to the main battery 21 via the connection portion 29. The main battery 21 is charged by use of the current supplied from the converter 3. The first system load 23 receives the current flowing through a path designated by an arrow 72. The arrow 72 extends from the converter 3 to the first system load 23 via the connection portion 29 and the connection portion 24.

The backup battery 31 receives the current flowing through a path designated by an arrow 73 during charging. The arrow 73 extends from the converter 3 to the backup battery 31 via the connection portion 29, the connection portion 24, the switch 4, and the connection portion 34. The backup battery 31 is charged by use of the current supplied from the converter 3. The second system load 33 receives the current flowing through an arrow 74. The arrow 74 extends from the converter 3 to the second system load 33 via the connection portion 29, the connection portion 24, the switch 4, and the connection portion 34.

(Paths of Currents Outputted from Batteries)

Figure 4:
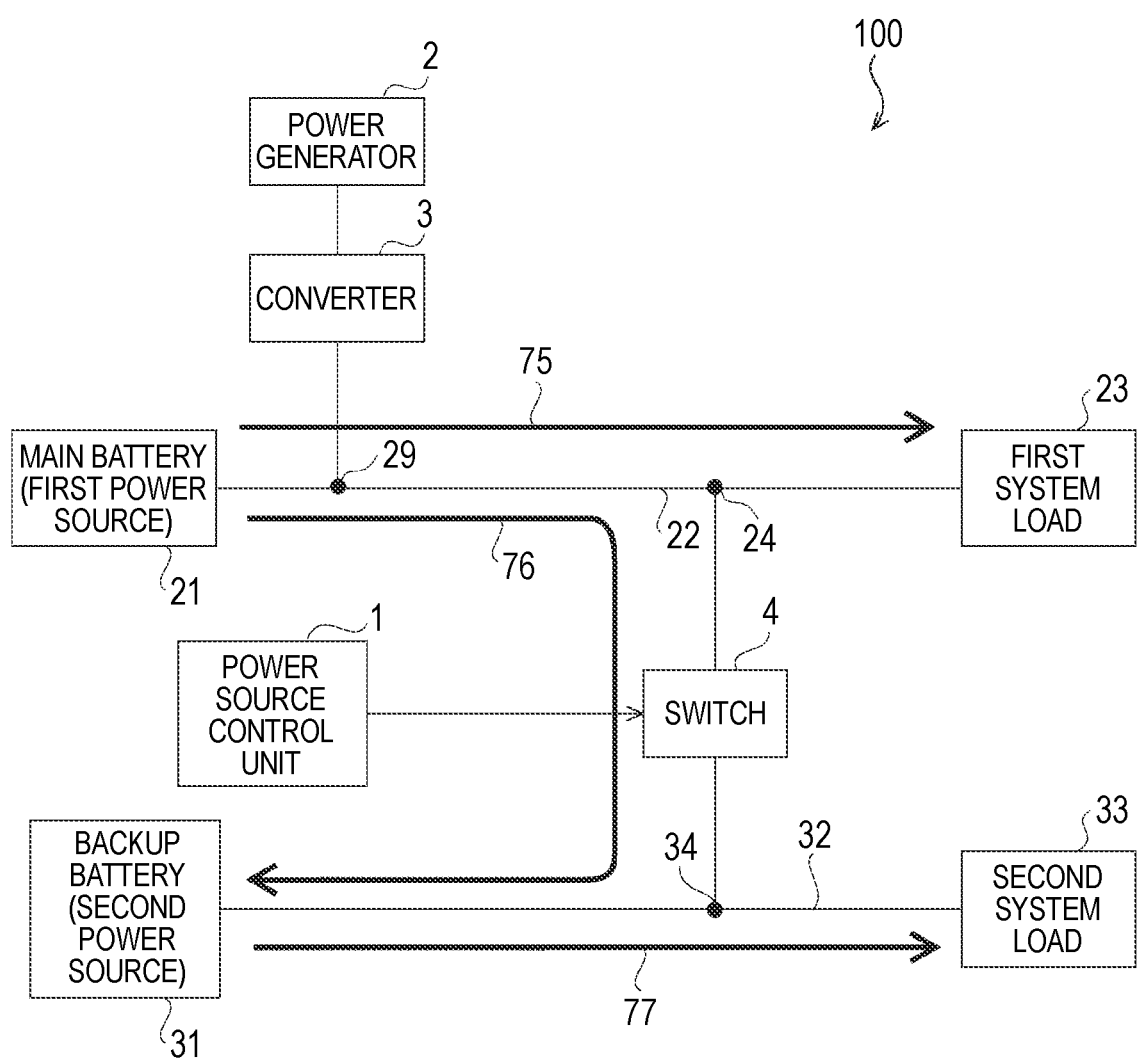
FIG. 4 is a diagram showing an example of paths of currents outputted from batteries shown in FIG. 1.

FIG. 4 is a diagram showing an example of paths of currents outputted from the main battery 21 and the backup battery 31. The respective sensors shown in FIG. 1, the wirings relevant to the respective sensors, the first system load 23, and the second system load 33 are omitted in FIG. 4.

Refer to FIG. 4. When the converter 3 does not output the current, the main battery 21 supplies the current to the first system load 23, the backup battery 31, and the second system load 33. Specifically, the first system load 23 receives the current flowing through a path designated by an arrow 75. The arrow 75 extends from the main battery 21 to the first system load 23 via the connection portion 29 and the connection portion 24.

The backup battery 31 receives the current flowing through a path designated by an arrow 76. The arrow 76 extends from the main battery 21 to the backup battery 31 via the connection portion 29, the connection portion 24, the switch 4, and the connection portion 34. The second system load 33 receives the current flowing through a path designated by an arrow 77. The arrow 77 extends from the backup battery 31 to the second system load 33 via the connection portion 34.

(Paths of Current Outputted from Backup Battery 31)

Refer to FIG. 4. The backup battery 31 supplies the current to the second system load 33. Specifically, the second system load 33 receives the current flowing through the path designated by the arrow 77. The arrow 77 extends from the backup battery 31 to the second system load 33 via the connection portion 34.

3. Operation of Power Source Control Unit 1

[3.1. Failure Determination of Main Battery 21]

[3.1.1. Summary of Failure Determination]

When both the first failure condition and the second failure condition are satisfied, the power source control unit 1 determines that the main battery 21 failed. Each of the first failure condition and the second failure condition will be described below in detail.

(First Failure Condition)

Figure 5:
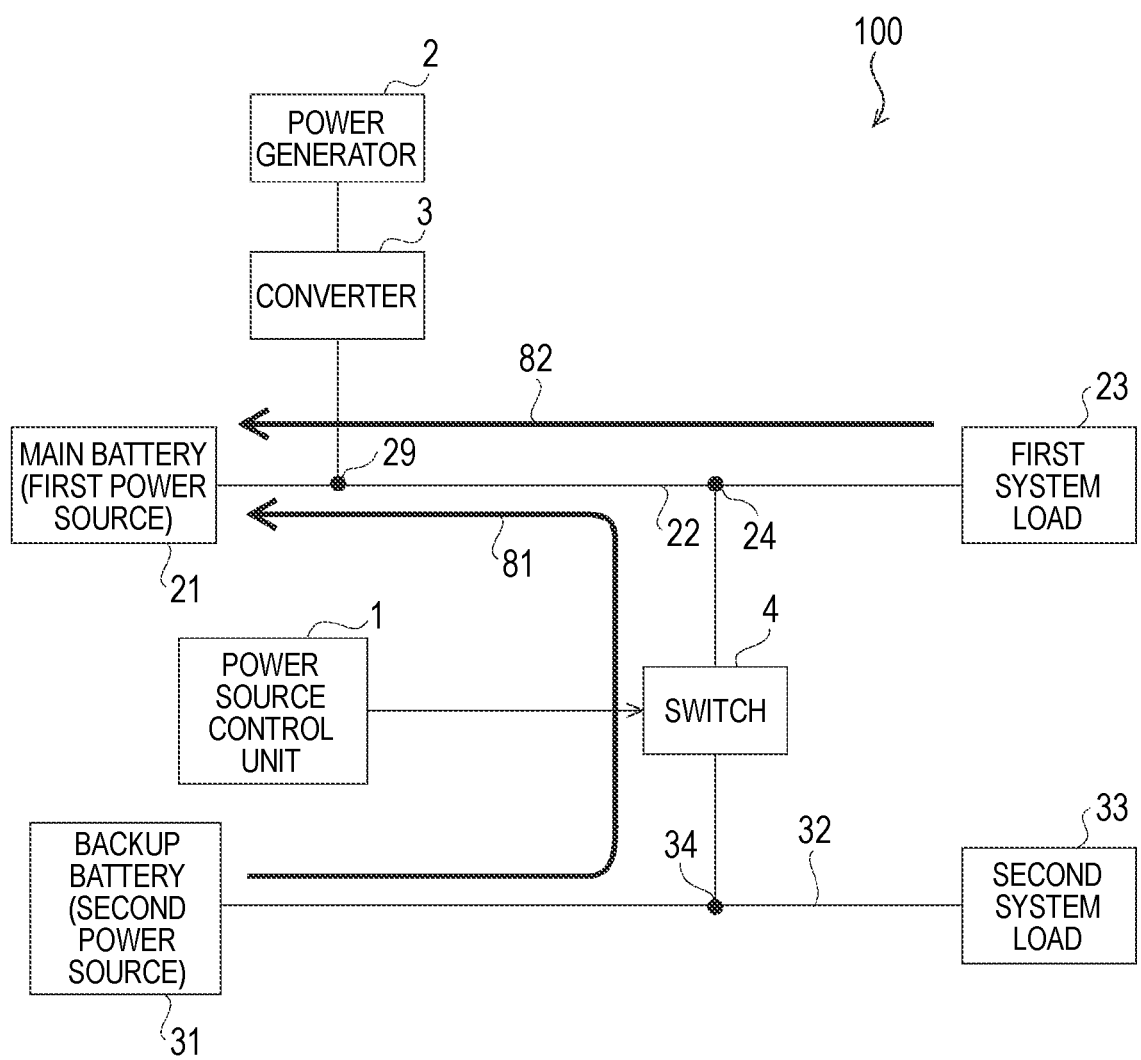
FIG. 5 is a diagram showing current paths in a case where one of the batteries shown in FIG. 1 has failed.

FIG. 5 is a diagram showing current paths in the case where the main battery 21 failed. Refer to FIG. 5. When the main battery 21 is grounded in an ON period of the switch 4, electric charges are continuously extracted from the backup battery 31. The extracted electric charges reach the grounded main battery 21 via a path designated by an arrow 81. The path designated by the arrow 81 is a path opposite to the path designated by the arrow 76 shown in FIG. 4.

When the main battery 21 is grounded, the backup battery 31 cannot be charged by the current outputted from the converter 3. This is because the current supplied from the converter 3 flows into the grounded main battery 21. That is, when the main battery 21 is grounded, the SOC value 51 of the backup battery 31 decreases. The power source control unit 1 can detect failure of the main battery 21 based on the temporal change of the SOC value 51.

The power source control unit 1 determines that the first failure condition is satisfied when the following two conditions are satisfied. The first condition is that the SOC value 51 higher than the first threshold is detected. The second condition is that the SOC value 51 decreases so as to be lower than the second threshold after the first condition is satisfied. Specific description will be made below with reference to FIG. 6.

Figure 6:
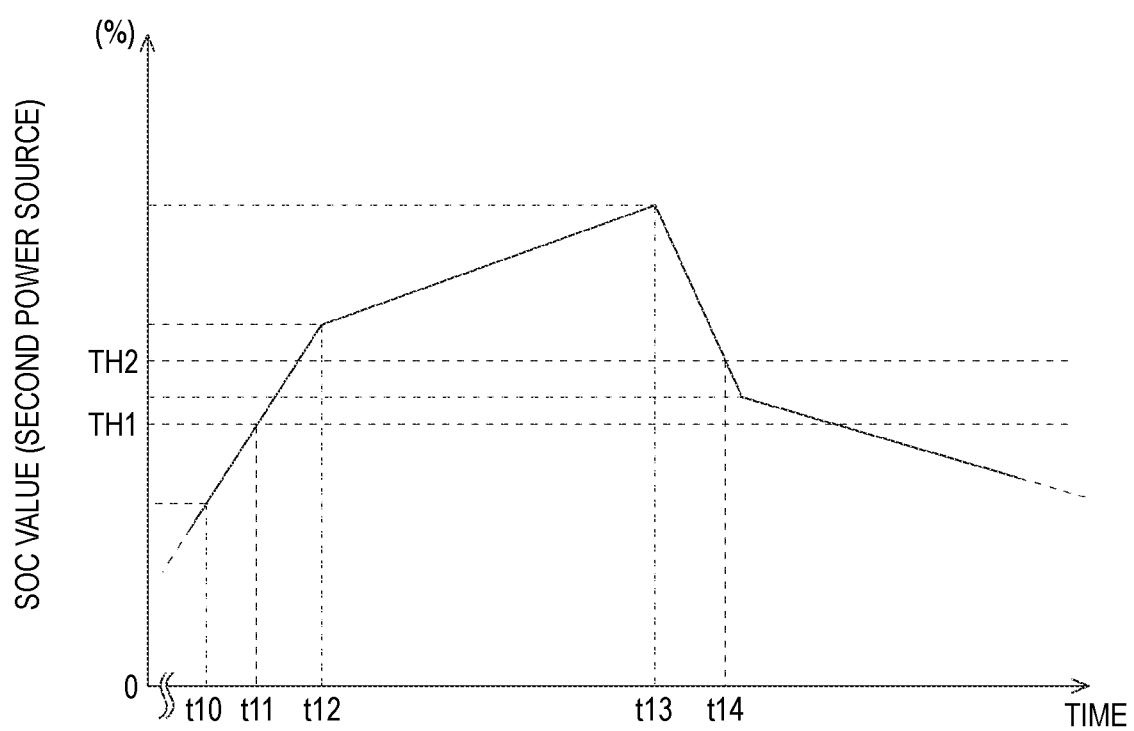
FIG. 6 is a graph showing an example of a temporal change of an SOC value of the other battery shown in FIG. 1.

FIG. 6 is a graph showing an example of the temporal change of the SOC value 51 of the backup battery 31 shown in FIG. 1. Refer to FIG. 6. The SOC value 51 is lower than a first threshold TH1 and a second threshold TH2 at a time instant t10. At the time instant t10, the power source control unit 1 however does not determine that the main battery 21 failed. This is because how the SOC value 51 changed over time in a period prior to the time instant t10 is not clear.

The backup battery 31 receives the supply of the current from the converter 3 in a period between the time instant t10 to a time instant t13. The SOC value 51 continuously increases from the time instant t10 to be higher than the first threshold TH1 at the time t11. From the time instant t11, the power source control unit 1 starts determination as to whether the first failure condition is satisfied or not.

Since the magnitude of the current received by the backup battery 31 changes at the time instant t12, the slope of the SOC value 51 changes. Assume that the main battery 21 is grounded at the time instant t13. The supply of the current by the converter 3 stops, and electric charges are extracted from the backup battery 31. Accordingly, the SOC value 51 starts decreasing from the time instant t13. The SOC value 51 starts decreasing from the time instant t13 to be lower than the second threshold TH2 at a time instant t14. The power source control unit 1 determines that the first failure condition is satisfied at the time instant t14. In such a manner, the power source control unit 1 can highly accurately determine whether the main battery 21 failed or not by use of the temporal change of the SOC value 51 of the backup battery 31.

The first threshold TH1 corresponds to a power amount with which the second system load 33 can execute automatic driving control for a predetermined sustenance time. The sustenance time is, for example, one hour. The first threshold TH1 is, for example, determined based on the sustenance time and maximum power consumption of the second system load 33.

The second threshold TH2 is higher than the first threshold TH1. The second threshold TH2 corresponds to a power amount with which the second system load 33 can execute automatic driving over a predetermined adjustment time. The adjustment time is longer than the sustenance time. The adjustment time is determined by adjusting the sustenance time in consideration of a margin time and a measurement error of the SOC value 51. For example, the margin time is 10% of the sustenance time, and added to the sustenance time. The measurement error of the SOC value 51 results from hysteresis voltage of the backup battery 31, a measurement error of the current sensor 35, a measurement error of the voltage sensor 37, a measurement error of the temperature sensor 38, etc.

(Second Failure Condition)

When the main battery 21 is grounded, the electric charges extracted from the backup battery 31 move to the grounded main battery 21. That is, when the main battery 21 is grounded, the backup battery 31 supplies a current to the main battery 21. Upon detection of the current supplied from the backup battery 31 to the main battery 21, the power source control unit 1 determines that the second failure condition is satisfied.

In normal operation of the power supply system 100, the current flows from the connection portion 29 toward the connection portion 24, as shown in FIG. 3. When the main battery 21 is grounded, the current flows from the connection portion 24 toward the connection portion 29, as shown in FIG. 5. That is, the power source control unit 1 can detect failure of the main battery 21 with high accuracy based on the direction of the current flowing from the connection portion 24 to the connection portion 29.

Incidentally, when the main battery 21 is grounded, electric charges accumulated in a capacitor of the first system load 23 pass through a path designated by an arrow 82 to reach the grounded main battery 21. Although not shown in FIG. 5, electric charges accumulated in a capacitor of the second system load 33 reach the grounded main battery 21 in a similar manner or the same manner. However, the current supplied to the main battery 21 by each of the first system load 23 and the second system load 33 is far smaller than the current supplied by the backup battery 31. Accordingly, the current supplied by each of the first system load 23 and the second system load 33 may be ignored.

[3.1.2. Flow Chart of Failure Determination]

Figure 7:
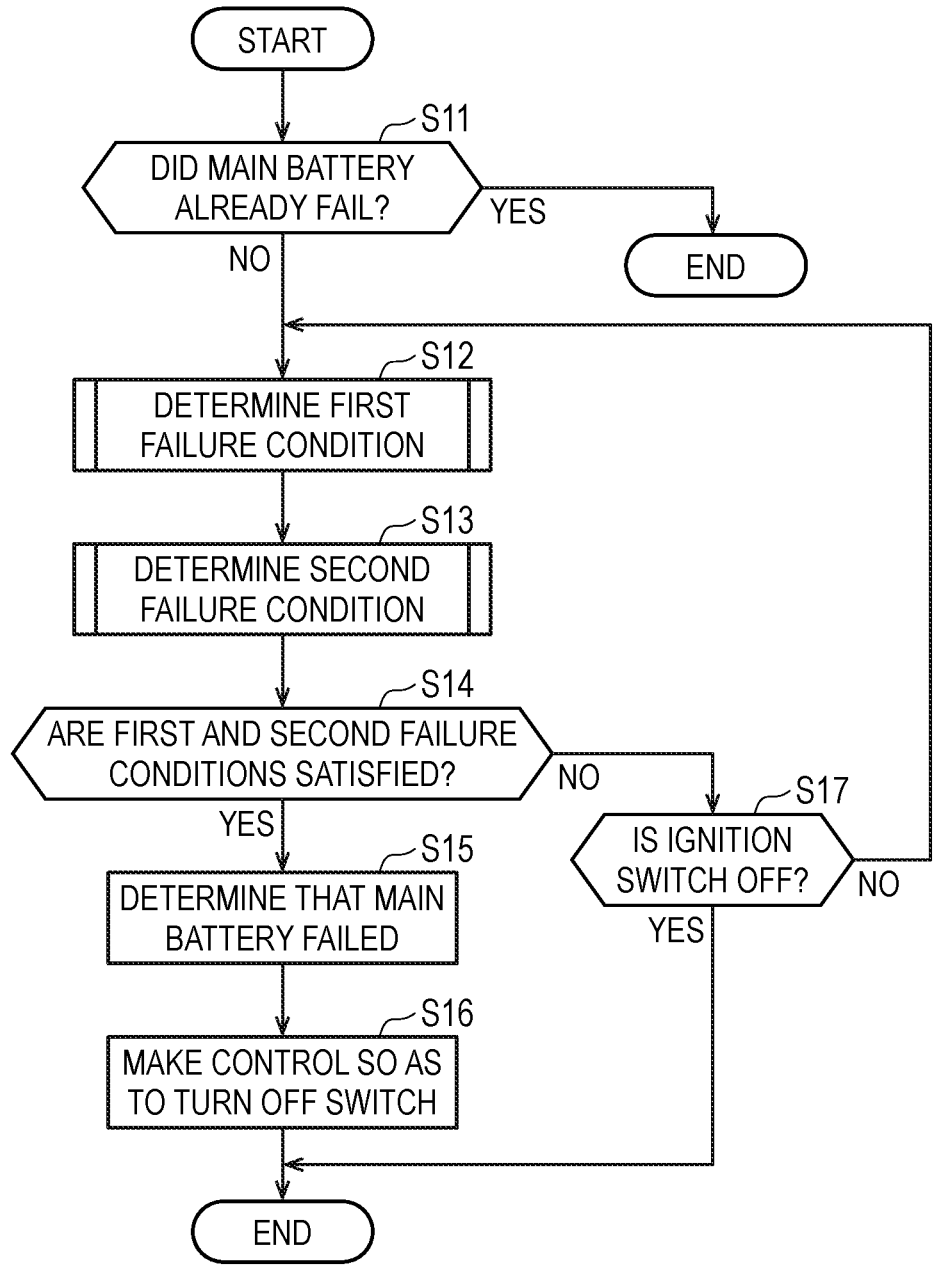
FIG. 7 is a flow chart showing operation of the power source control unit for determining whether the battery shown in FIG. 1 failed or not.

FIG. 7 is a flow chart showing operation of the power source control unit 1 for determining whether the main battery 21 failed or not. When an ignition switch of the vehicle mounted with the power supply system 100 is turned ON, the power source control unit 1 starts processing shown in FIG. 7.

Refer to FIG. 7. The power source control unit 1 determines whether the main battery 21 already failed or not (step S11). Specifically, the failure determination portion 16 reads status data 60 from the storage portion 18. When failure occurrence of the main battery 21 has been recorded in the read status data 60, the failure determination portion 16 determines that the main battery 21 already failed (Yes in the step S11). The power source control unit 1 terminates the processing shown in FIG. 7.

When the main battery 21 did not fail (No in the step S11), the power source control unit 1 determines whether a first failure condition is satisfied or not (step S12). The power source control unit 1 determines whether a second failure condition is satisfied or not (step S13). Details about the steps S12 and S13 will be described later.

The power source control unit 1 determines whether both the first failure condition and the second failure condition are satisfied or not (step S14). Specifically, the failure determination portion 16 determines whether the first failure condition is satisfied or not, based on a first SOC determination result 52 and a second SOC determination result 53. The failure determination portion 16 determinates whether the second failure condition is satisfied or not, based on current supply information 54 received from the current determination portion 15.

When both the first failure condition and the second failure condition are satisfied (Yes in step S14), the failure determination portion 16 determines that the main battery 21 failed (step S15). The failure determination portion 16 sends a notification that the failure of the main battery 21 occurred to the switch control portion 17. Based on the notification from the failure determination portion 16, the switch control portion 17 outputs a control signal 1S to the switch 4 to turn OFF the switch 4 (step S16). Supply of the current from the backup battery 31 toward the main battery 21 stops due to the OFF of the switch 4. Thus, the backup battery 31 can supply, to the second ADS load 331, power for continuing automatic driving over a sustenance time.

When at least one of the first failure condition and the second failure condition is not satisfied (No in the step S14), the failure determination portion 16 determines that the battery 21 did not fail. Then, the power source control unit 1 goes to a step S17. When the ignition switch is OFF (Yes in the step S17), the power source control unit 1 terminates the processing shown in FIG. 7. When the ignition switch is ON (No in the step S17), the power source control unit 1 returns to the step S12 to repeat determination as to whether the main battery 21 failed or not.

[3.1.3. First Failure Condition Determination (Step S12)]

Figure 8:
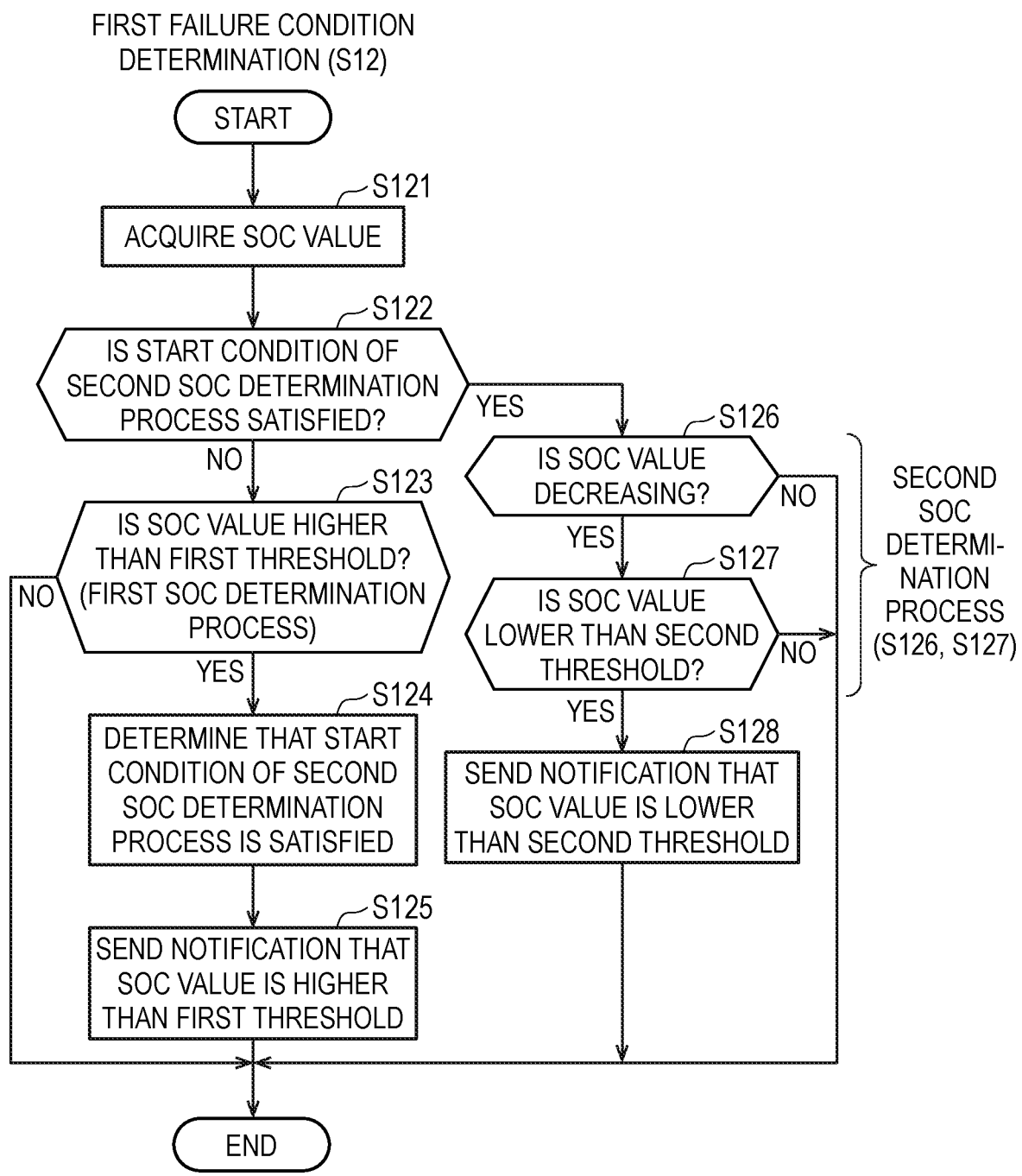
FIG. 8 is a flow chart of a first failure condition determination process shown in FIG. 7.

FIG. 8 is a flow chart of the first failure condition determination (step S12) shown in FIG. 7. Refer to FIG. 8. A step S123 is a first SOC determination process. Steps S126 and S127 are a second SOC determination process.

(Acquisition of SOC Value 51)

The SOC acquisition portion 11 acquires an SOC value 51 of the backup battery 31 (step S121). Specifically, the SOC acquisition portion 11 acquires a current measurement value I35 from the current sensor 35 with a predetermined frequency, and integrates current measurement values 135 acquired thus. The SOC acquisition portion 11 determines the SOC value 51 based on the integrated value of the current measurement values 135. An algorithm for determining the SOC value 51 based on the integrated value of the current measurement values 135 is not limited particularly.

The SOC acquisition portion 11 corrects the SOC value 51 based on the integrated value of the current measurement values 135 by use of a voltage measurement value E37 and a temperature measurement value T38. Specifically, the SOC acquisition portion 11 acquires the voltage measurement value E37 from the voltage sensor 37, and acquires the temperature measurement value T38 from the temperature sensor 38. When the acquired voltage measurement value E37 is within a predetermined range, the SOC acquisition portion 11 determines to correct the SOC value 51 determined based on the integrated value of the current measurement values 135.

The SOC acquisition portion 11 specifies an SOC-CCV curve corresponding to the acquired temperature measurement value T38 from a plurality of SOC-CCV curves corresponding to a plurality of temperatures. The plurality of SOC-CCV curves have been stored in the storage portion 18 in advance. The SOC acquisition portion 11 determines an SOC value 51 corresponding to the acquired voltage measurement value E37 with reference to the specified SOC-CCV curve. The SOC acquisition portion 11 replaces the SOC value 51 based on the current measurement values I35 with the SOC value 51 corresponding to the acquired voltage measurement value.

Incidentally, the algorithm for determining the SOC value 51 based on the voltage measurement value E37 and the temperature measurement value T38 is not limited particularly. In addition, the SOC acquisition portion 11 may acquire the SOC value 51 of the backup battery 31 from another unit than the power source control unit 1.

(First SOC Determination Process)

The SOC acquisition portion 11 determines whether a start condition of the second SOC determination process is satisfied or not, based on a not-shown start flag (step S122). The start flag is initialized to 0 when the power source control unit 1 starts processing shown in FIG. 8. The start flag set to 0 expresses that the start condition of the second SOC determination process is not satisfied. The start flag set to 1 expresses that the start condition of the second SOC determination process is satisfied.

When the start flag is 1, the SOC acquisition portion 11 determines that the start condition of the second SOC determination process is satisfied (Yes in the step S122). The SOC acquisition portion 11 outputs the SOC value 51 acquired in the step S121 to the second SOC determination portion 13. Then, the step S126 is executed by the second SOC determination portion 13. The step S126 will be described later.

On the other hand, when the start flag is 0, the SOC acquisition portion 11 determines that the start condition of the second SOC determination process is not satisfied (No in the step S122). The SOC acquisition portion 11 outputs the SOC value 51 acquired in the step S121 to the first SOC determination portion 12.

The first SOC determination portion 12 executes the first SOC determination process of comparing the SOC value 51 received from the SOC acquisition portion 11 with a first threshold TH1 (the step S123). That is, the first SOC determination portion 12 determines whether the backup battery 31 can supply predetermined power to the second system load for a predetermined sustenance time or not, based on the SOC value 51 received from the SOC acquisition portion 11.

When the received SOC value 51 is not higher than the first threshold TH1 (No in the step S123), the first SOC determination portion 12 determines that the start condition of the second SOC determination process is not satisfied. Then, the first SOC determination portion 12 terminates the processing shown in FIG. 8. On the other hand, when the received SOC value 51 is higher than the first threshold TH1 (Yes in the step S123), the first SOC determination portion 12 determines that the start condition of the second SOC determination process is satisfied (step S124). The SOC acquisition portion 11 changes the start flag from 0 to 1. The first SOC determination portion 12 outputs, to the failure determination portion 16, a first SOC determination result 52 indicating that the SOC value 51 is higher than the first threshold TH1 (step S125). Then, the first SOC determination portion 12 terminates the processing shown in FIG. 8.

(Second SOC Determination Process)

When the start condition of the second SOC determination process is satisfied (Yes in the step S122), the second SOC determination portion 13 executes the second SOC determination process (the steps S126 and S127) by use of the SOC value 51 received from the SOC acquisition portion 11.

When the received SOC value 51 is not increasing or changing (No in step S126), the second SOC determination portion 13 terminates the processing shown in FIG. 8.

On the other hand, when the received SOC value 51 is decreasing (Yes in the step S126), the second SOC determination portion 13 compares the received SOC value 51 with a second threshold TH2 (the step S127). When the received SOC value 51 is not lower than the second threshold TH2 (No in the step S127), the second SOC determination portion 13 terminates the processing shown in FIG. 8. On the other hand, when the received SOC value 51 is lower than the second threshold TH2 (Yes in the step S127), the second SOC determination portion 13 outputs, to the failure determination portion 16, a second SOC determination result 53 indicating that the SOC value 51 has decreased to be lower than the second threshold TH2 (step S128). Then, the second SOC determination portion 13 terminates the processing shown in FIG. 8. That is, when the SOC value 51 has monotonously decreased to change from a value higher than the second threshold TH2 to a value lower than the second threshold TH2, the failure determination portion 16 executes the step S128.

{Second Failure Condition Determination (Step S13)}

Figure 9:
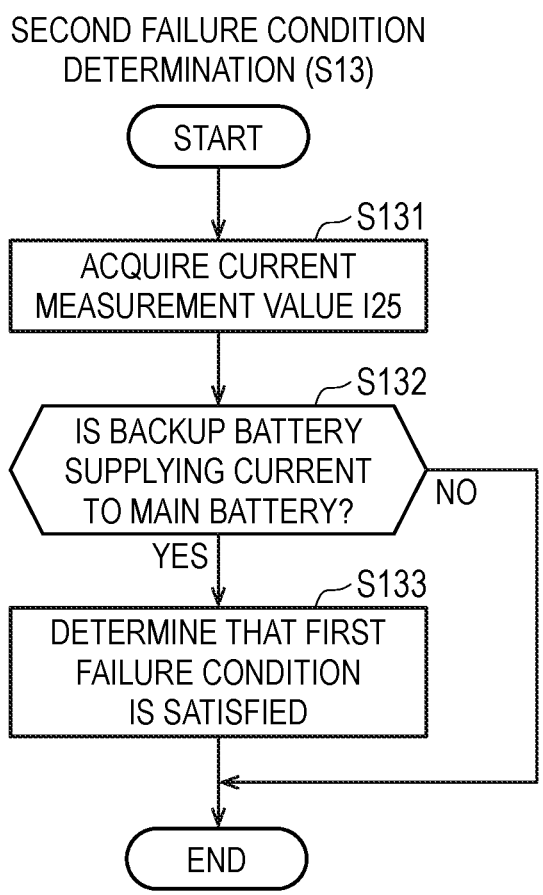
FIG. 9 is a flow chart of a second failure condition determination process shown in FIG. 7.

FIG. 9 is a flow chart of the second failure condition determination (the step S13) shown in FIG. 7. Refer to FIG. 9. The current acquisition portion 14 acquires a power source current value I25 from the current sensor 25 (step S131). The current acquisition portion 14 outputs the power source current value I25 acquired in the step S131 to the current determination portion 15.

The current determination portion 15 receives the power source current value I25 from the current acquisition portion 14. The current determination portion 15 determines whether the backup battery 31 is supplying a current to the main battery 21 or not, based on the received power source current value I25 (step S132).

Refer to FIG. 1. Assume that a current is flowing from the connection portion 29 toward the connection portion 24 when the sign of the power source current value I25 is positive. When the sign of the power source current value I25 acquired in the step S131 is positive on the assumption, the current is being supplied from the main battery 21 to the first system load 23, the backup battery 31, and the second system load 33. In this case, the current determination portion 15 determines that the backup battery 31 is not supplying the current to the main battery 21 (No in the step S132). Then, the current determination portion 15 terminates the processing shown in FIG. 9.

When the sign of the power source current value I25 is negative, the current is being supplied from the backup battery 31 to the main battery 21 (Yes in the step S132). In this case, the current determination portion 15 outputs, to the failure determination portion 16, current supply information 54 indicating that the backup battery 31 is supplying the current to the main battery 21 (step S133). Then, the current determination portion 15 terminates the processing shown in FIG. 9.

[3.2. Detection of Abnormality of First Power Line 22 and Failure of First System Load 23]

In the following description, assume that the current is flowing from the connection portion 24 toward the first system load 23 when the sign of a load current value I26 is positive.

[3.2.1. Summary]

(Detection of Failure of First System Load 23)

Figure 10:
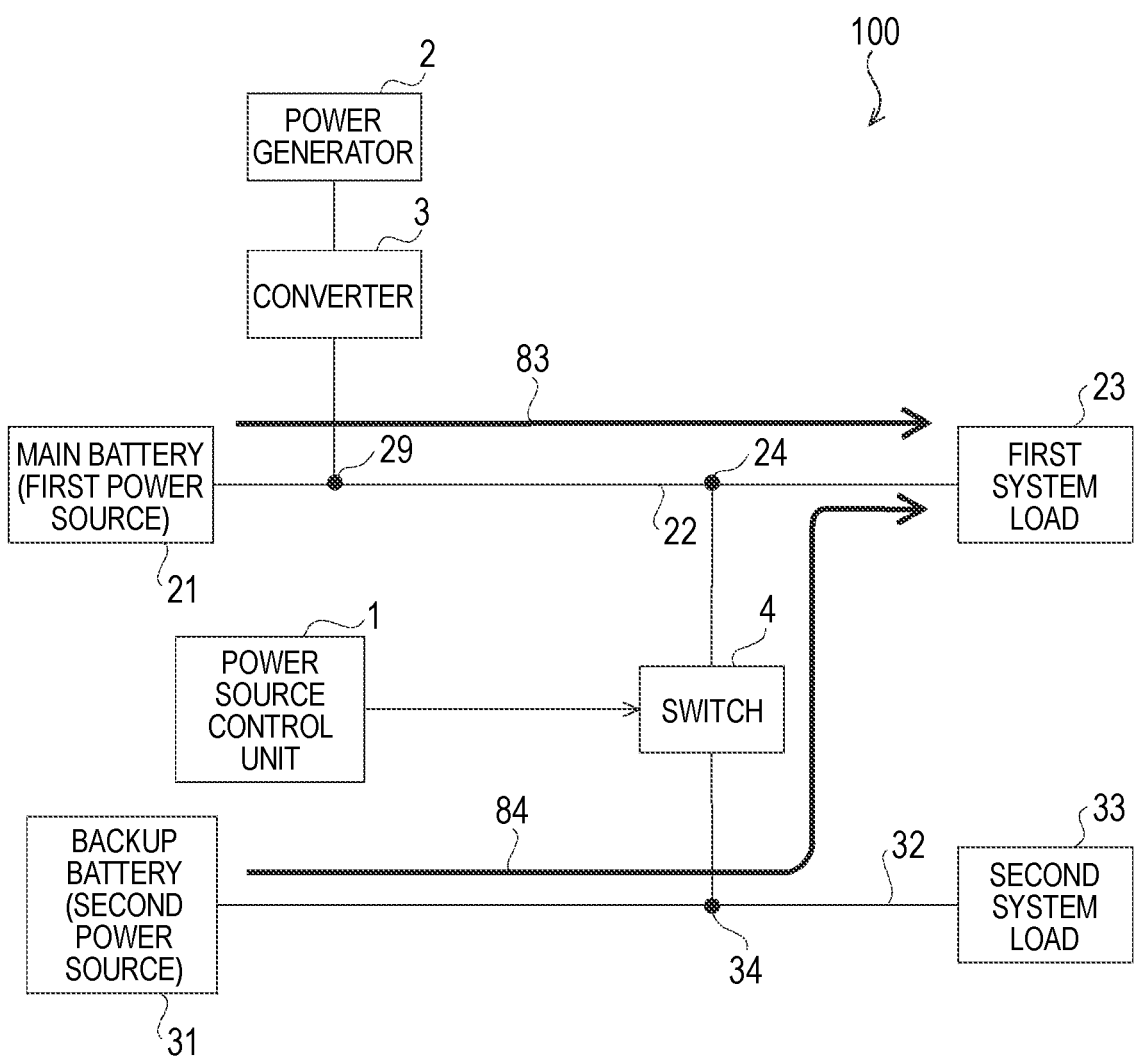
FIG. 10 is a diagram showing current paths when a first system load shown in FIG. 1 is grounded.

FIG. 10 is a diagram showing current paths when the first system load 23 is grounded. Refer to FIG. 10. When the first system load 23 is grounded, electric charges accumulated in the main battery 21 and the backup battery 31 are extracted by the grounded first system load 23.

Specifically, the electric charges extracted from the main battery 21 pass through a path designated by an arrow 83 to reach the grounded first system load 23. The path designated by the arrow 83 is the same as the path designated by the arrow 75 shown in FIG. 4. The electric charges extracted from the backup battery 31 pass through a path designated by an arrow 84 to reach the grounded first system load 23. The path designated by the arrow 84 extends from the backup battery 31 to the first system load 23 via the connection portion 34, the switch 4 and the connection portion 24.

Each of the main battery 21 and the backup battery 31 supplies the current to the grounded first system load 23. Accordingly, the load current value I26 is larger than a maximum rated current of the first system load 23. Maximum current consumption of the first system load 23 is the total of maximum current consumption of the first ADS load 231 and maximum current consumption of the general load 232. When the load current value I26 expresses a current larger than the maximum rated current of the first system load 23, the power source control unit 1 can determine that the first system load 23 failed.

(Detection of Abnormality of First Power Line 22)

Figure 11:
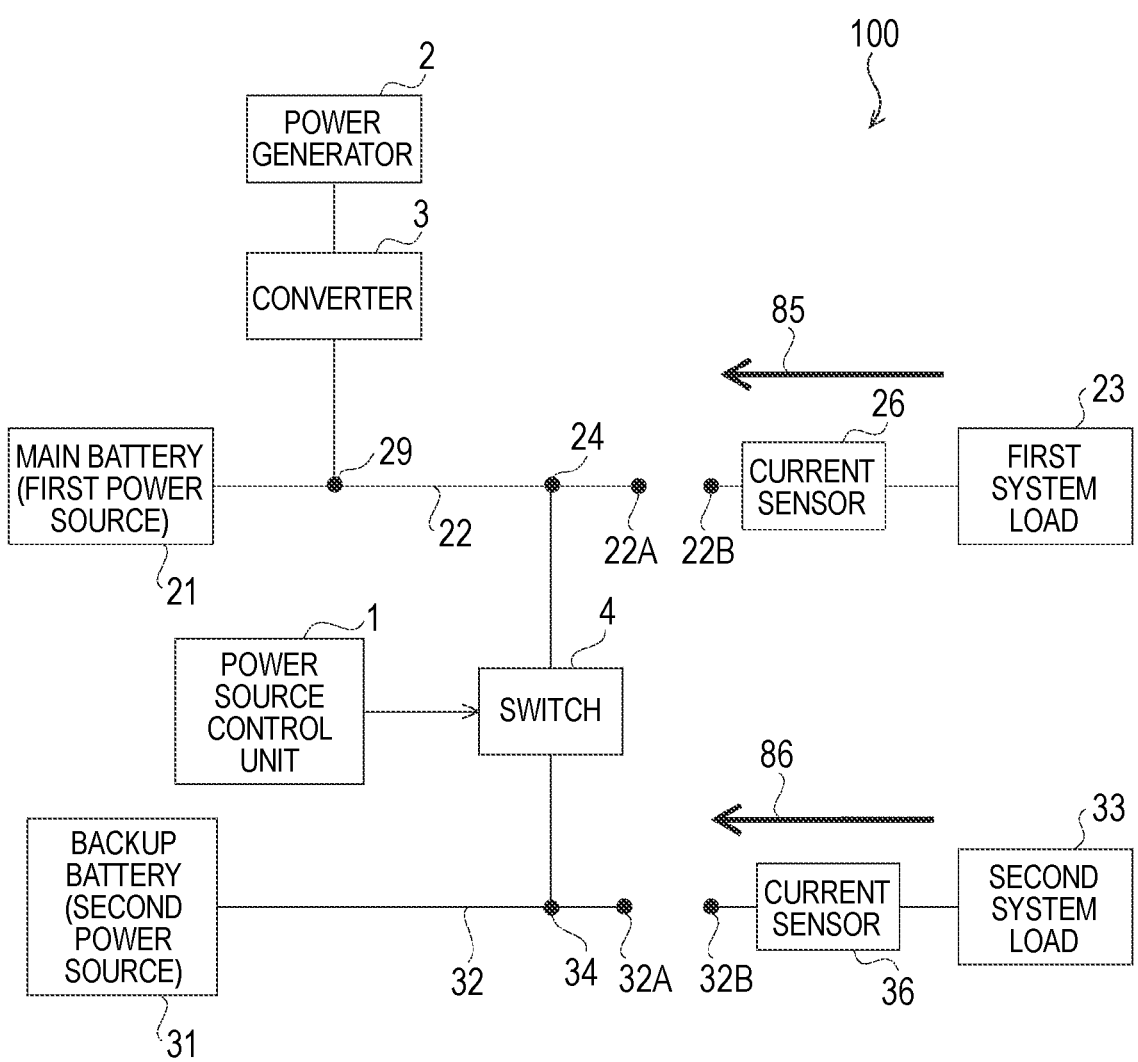
FIG. 11 is a diagram showing current paths when abnormality occurred in power lines shown in FIG. 1.

FIG. 11 is a diagram showing current paths when abnormality occurred in the first power line 22 or the second power line 32. Incidentally, FIG. 11 does not show a state in which both the first power line 22 and the second power line 32 are disconnected. Refer to FIG. 11. Assume that a section between a cut portion 22A and a cut portion 22B in the first power line 22 is disconnected due to some cause. The cut portions 22A and 22B are included in a section between the connection portion 24 and the current sensor 26 in the first power line 22. The cut portion 22A is closer to the connection portion 24 than the cut portion 22B.

When the cut portion 22B in the disconnected first power line 22 is grounded, a current flowing through a path designated by an arrow 85 occurs. The arrow 85 expresses a path between the first system load 23 and the grounded cut portion 22B. The current reaching the cut portion 22B flows out to the ground. The current flowing through the path designated by the arrow 85 results from electric charges accumulated in the capacitor included in the first system load 23. When the cut portion 22B is grounded, the sign of the load current value I26 is negative. That is, when the first system load 23 is outputting the current to the first power line 22, the power source control unit 1 can determine that abnormality occurred in the first power line 22. Based on the determination as to whether the first system load 23 is outputting the current to the first power line 22 or not, the power source control unit 1 can detect the abnormality which occurred in the first power line 22.

[3.2.2. Flow Chart]

Figure 12:
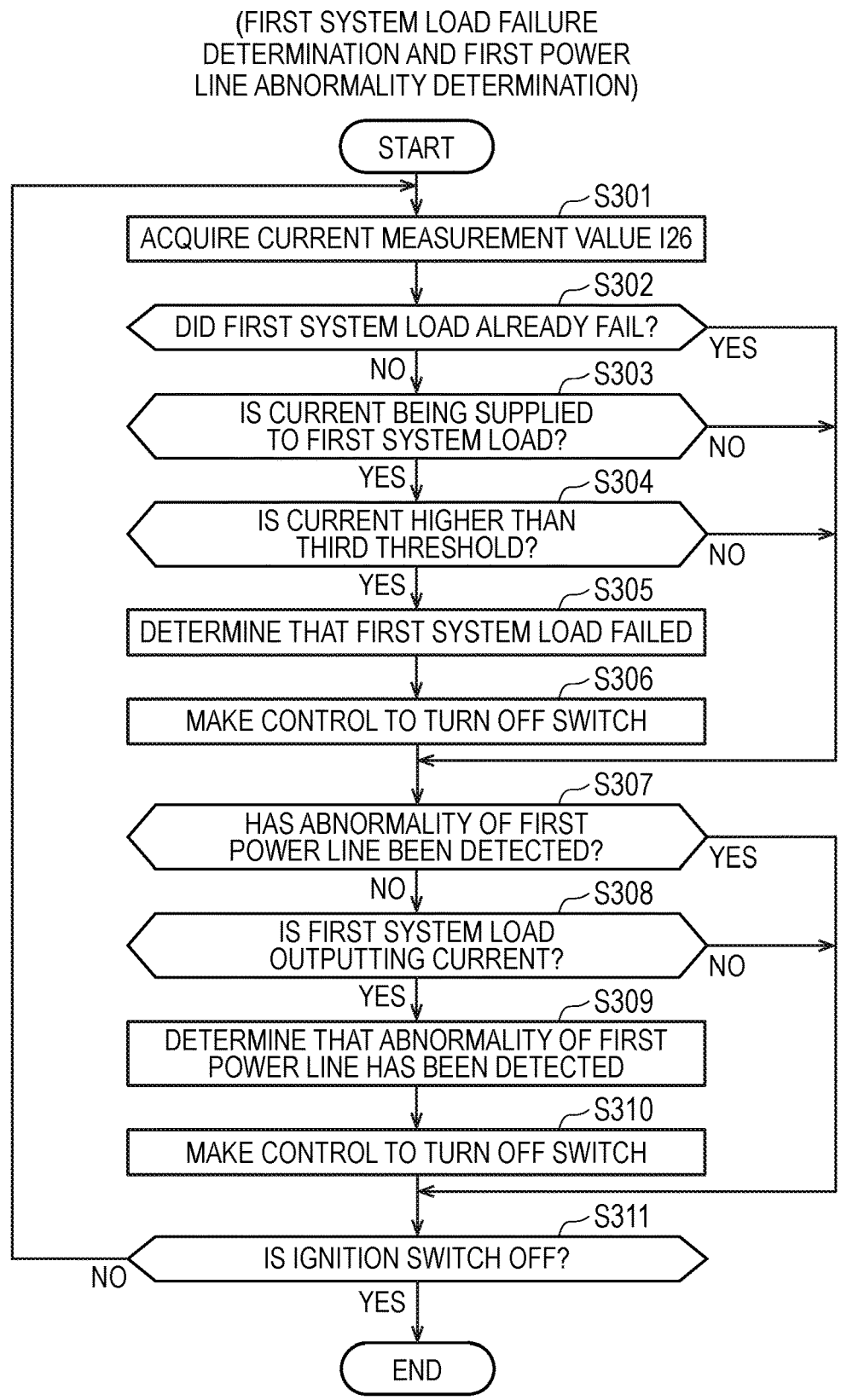
FIG. 12 is a flow chart showing operation of the power source control unit for detecting failure of the first system load shown in FIG. 1 and abnormality of a first one of the power lines shown in FIG. 1.

FIG. 12 is a flow chart showing operation of the power source control unit 1 for detecting the failure of the first system load 23 and the abnormality of the first power line 22. The power source control unit 1 starts processing shown in FIG. 12 in response to ON of the ignition switch.

The processing shown in FIG. 12 is executed in parallel with the processing shown in FIG. 7. In the processing shown in FIG. 12, steps 302 to 306 are processing relevant to the first system load 23, and steps S307 to S310 are processing relevant to the first power line 22.

Refer to FIG. 12. The current acquisition portion 14 acquires a load current value I26 from the current sensor 26 (step S301). The failure determination portion 16 determines whether the first system load 23 already failed or not (the step S302).

When the failure of the first system load 23 has been recorded in status data 60 stored in the storage portion 18, the failure determination portion 16 determines that the first system load 23 already failed (Yes in the step S302). Then, the power source control unit 1 goes to the step S307.

On the other hand, when the failure of the first system load 23 has not been recorded in the status data 60 stored in the storage portion 18, the failure determination portion 16 determines that the first system load 23 did not fail (No in the step S302). In this case, the current determination portion 15 determines whether a current is being supplied to the first system load 23 or not, based on the load current value I26 acquired in the step S301 (the step S303).

When the sign of the load current value I26 is negative, the current determination portion 15 determines that the current is not being supplied to the first system load 23 (No in the step S303). The power source control unit 1 determines that the first system load 23 did not fail. Then, the power source control unit 1 goes to the step S307.

When the load current value I26 is higher than zero, the current determination portion 15 determines that the current is being supplied to the first system load 23 (Yes in the step S303). The current determination portion 15 determines whether the load current value I26 is higher than a third threshold or not (the step S304). The third threshold is the maximum current consumption current of the first system load 23, as described above.

When the load current value I26 is not higher than the third threshold (No in the step S304), the power source control unit 1 goes to the step S307.

On the other hand, when the load current value I26 is higher than the third threshold (Yes in the step S304), the current determination portion 15 outputs, to the failure determination portion 16, first load status information 55 indicating that the current higher than the third threshold is being supplied to the first system load 23.

The failure determination portion 16 determines that the first system load 23 failed, based on the first load status information 55 received from the current determination portion 15 (the step S305). The failure determination portion 16 records the failure of the first system load 23 into the status data 60. The failure determination portion 16 sends the switch control portion 17 a notification that the first system load 23 failed.

When the notification that the first system load 23 failed is sent from the failure determination portion 16, the switch control portion 17 outputs a control signal 1S instructing OFF of the switch 4 to the switch 4 (the step S306). Due to the OFF of the switch 4, connection between the main battery 21 and the backup battery 31 is cut off.

The power source control unit 1 refers to the status data 60 to determine whether abnormality already occurred in the first power line 22 or not (the step S307). When the occurrence of the abnormality of the first power line 22 has been recorded in the status data 60 (Yes in the step S307), the power source control unit 1 terminates the processing shown in FIG. 12. On the other hand, when the occurrence of the abnormality of the first power line 22 has not been recorded in the status data 60 (No in the step S307), the current determination portion 15 determines whether the first system load 23 is outputting the current or not, based on the load current value I26 acquired in the step S301 (the step S308).

When the load current value I26 is equal to or higher than zero, the current determination portion 15 determines that the first system load 23 is not outputting the current (No in the step S308). The failure determination portion 16 determines that abnormality did not occur in the first power line 22. Then, the power source control unit 1 terminates the processing shown in FIG. 12.

On the other hand, when the load current value I26 is lower than zero, the current determination portion 15 determines that the first system load 23 is outputting the current (Yes in the step S308). In this case, the failure determination portion 16 determines that the abnormality of the first power line 22 has been detected (the step S309). The failure determination portion 16 records the abnormality of the first power line 22 into the status data 60. When the failure determination portion 16 has detected the abnormality of the first power line 22, the switch control portion 17 outputs a control signal 1S instructing OFF of the switch 4 to the switch 4 (the step S310). Due to the OFF of the switch 4, connection between the main battery 21 and the backup battery 31 is cut off.

When the ignition switch is ON (No in a step S311), the power source control unit 1 returns to the step S301 to repeat the processing shown in FIG. 12. When the ignition switch is OFF (Yes in the step S311), the power source control unit 1 terminates the processing shown in FIG. 12.

[3.3. Detection of Abnormality of Second Power Line 32 and Failure of Second System Load 33]

In the following description, assume that currents are flowing from the connection portion 34 toward the second system load 33 when the sign of the load current value I36 is positive.

[3.3.1. Summary]

(Detection of Failure of Second System Load 33)

Figure 13:
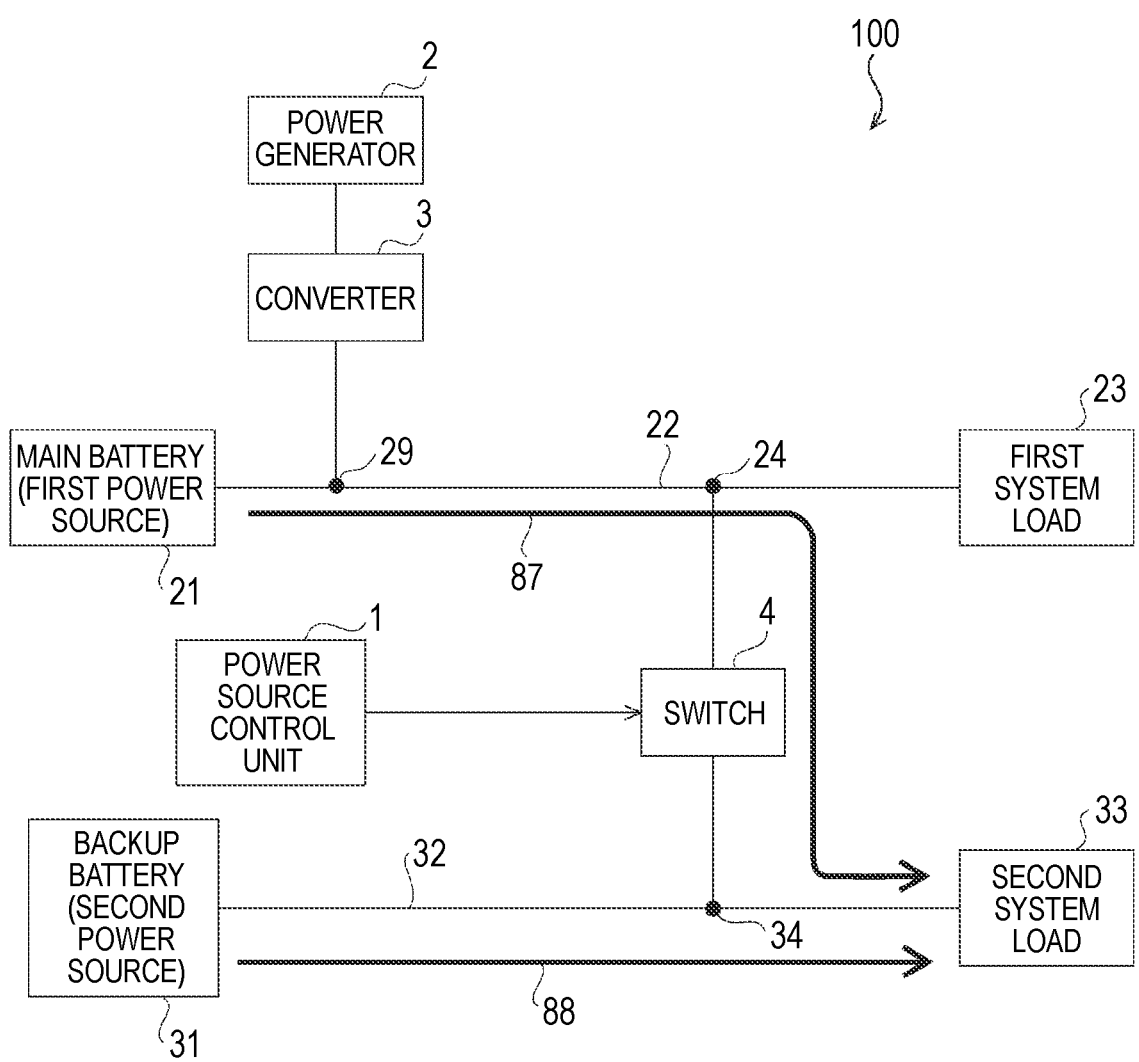
FIG. 13 is a diagram showing flows of currents when a second system load shown in FIG. 1 failed.

FIG. 13 is a diagram showing flows of currents when the second system load 33 is grounded. Refer to FIG. 13. When the second system load 33 is grounded, electric charges accumulated in the main battery 21 and the backup battery 31 are extracted by the grounded second system load 33.

Specifically, the electric charges extracted from the main battery 21 pass through a path designated by an arrow 87 to reach the grounded second system load 33. The arrow 87 expresses a path extending from the main battery 21 to the second system load 33 via the connection portion 29, the connection portion 24, the switch 4 and the connection portion 34. The electric charges extracted from the backup battery 31 pass through a path designated by an arrow 88 to reach the grounded second system load 33. The path designated by the arrow 88 is the same as the path designated by the arrow 77 shown in FIG. 4.

Both the main battery 21 and the backup battery 31 supply the currents to the grounded second system load 33. Accordingly, the load current value I36 is larger than the maximum consumption current of the second system load 33. Accordingly, when the load current value I36 expresses a current larger than the maximum rated current of the second system load 33, the power source control unit 1 can determine that the second system load 33 failed.

(Detection of Abnormality of Second Power Line 32)

Refer to FIG. 11. Assume that a section between a cut portion 32A and a cut portion 32B in the second power line 32 is disconnected due to some cause. The cut portions 32A and 32B are included in a section between the connection portion 34 and the current sensor 36 in the second power line 32. The cut portion 32A is closer to the connection portion 34 than the cut portion 32B.

When the cut portion 32B is grounded, the current flowing through a path designated by an arrow 86 occurs. The arrow 86 expresses a path between the second system load 33 and the grounded cut portion 32B. The current reaching the cut portion 32B flows out to the ground. The current flowing through the path designated by the arrow 86 results from electric charges accumulated in the capacitor included in the second system load 33. Since the cut portion 32B is grounded, the sign of a load current value I36 is negative. That is, when the second system load 33 is outputting the current to the second power line 32, determination is made that the second system load 33 failed. Based on the determination as to whether the second system load 33 is outputting the current to the second power line 32 or not, the power source control unit 1 can detect abnormality which occurred in the second power line 32.

[3.3.2. Flow Chart]

Figure 14:
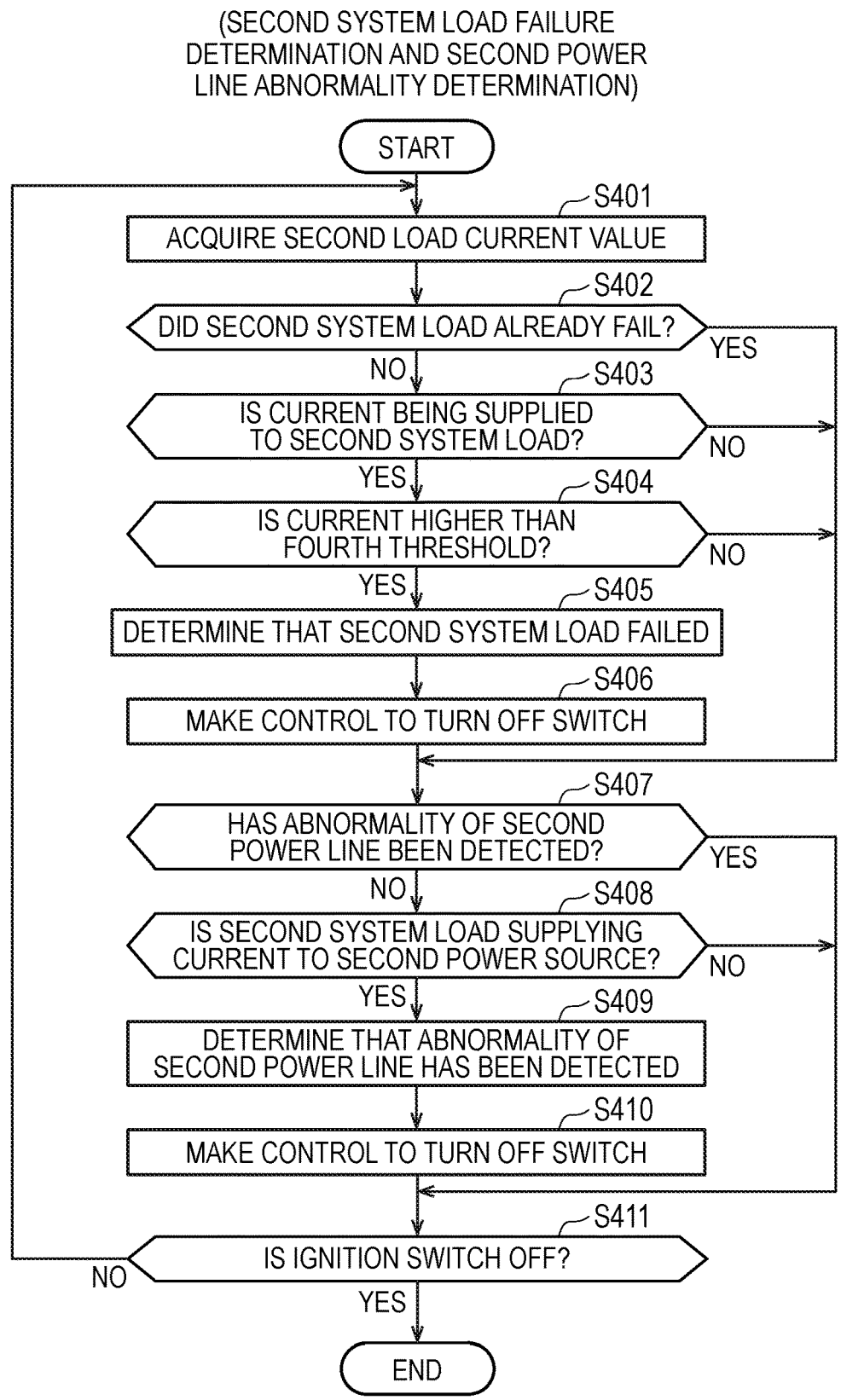
FIG. 14 is a flow chart showing operation of the power source control unit for detecting failure of the second system load shown in FIG. 1 and abnormality of a second one of the power lines shown in FIG. 1.

FIG. 14 is a flow chart showing operation of the power source control unit 1 for detecting the failure of the second system load 33 and the abnormality of the second power line 32. The power source control unit 1 starts processing shown in FIG. 14 in response to ON of the ignition switch.

The processing shown in FIG. 14 is executed in parallel with the processings shown in FIG. 7 and FIG. 12. In the processing shown in FIG. 14, steps S402 to S406 are processing relevant to the second system load 33, and steps S407 to S410 are processing relevant to the second power line 32.

The current acquisition portion 14 acquires the load current value I36 from the current sensor 36 (step S401). The power source control unit 1 refers to status data 60 stored in the storage portion 18 to determine whether the second system load 33 already failed or not (the step S402).

When the second system load 33 already failed (Yes in the step S402), the power source control unit 1 goes to the step S407. On the other hand, when the second system load 33 did not fail (No in the step S402), the power source control unit 1 goes to the step S403.

The current determination portion 15 determines whether the current is being supplied to the second system load 33 or not, based on the load current value I36 acquired in the step S401 (the step S403). When the load current value I36 is equal to or lower than zero, the current determination portion 15 determines that the current is not being supplied to the second system load 33 (No in the step S403). The power source control unit 1 determines that the second system load 33 did not fail. Then, the power source control unit 1 goes to the step S407. On the other hand, when the load current value I36 is higher than zero, the current determination portion 15 determines that the current is being supplied to the second system load 33 (Yes in the step S403). The current determination portion 15 determines whether the load current value I36 is higher than a fourth threshold or not (the step S404).

When the load current value I36 is higher than the fourth threshold (Yes in the step S404), the failure determination portion 16 determines that the second system load 33 failed (the step S405). The failure determination portion 16 records the failure of the second system load 33 into the status data 60. When the failure determination portion 16 has detected the failure of the second system load 33, the switch control portion 17 outputs a control signal 1S instructing OFF of the switch 4 to the switch 4 (the step S406). Due to the OFF of the switch 4, connection between the main battery 21 and the backup battery 31 is cut off.

Next, the power source control unit 1 refers to the status data 60 stored in the storage portion 18, so as to determine whether abnormality already occurred in the second power line 32 or not (the step S407).

When the abnormality already occurred in the second power line 32 (Yes in the step S407), the power source control unit 1 terminates the processing shown in FIG. 14.

On the other hand, when the abnormality of the second power line 32 has not been recorded in the status data 60 (No in the step S407), the current determination portion 15 determines whether the second system load 33 is outputting the current or not, based on the load current value I36 acquired in the step S401 (the step S408).

When the load current value I36 is equal to or higher than zero, the current determination portion 15 determines that the second system load 33 is not outputting the current (No in the step S408). The failure determination portion 16 determines that abnormality did not occur in the second power line 32. Then, the power source control unit 1 terminates the processing shown in FIG. 14.

When the load current value I36 is lower than zero, the current determination portion 15 determines that the second system load 33 is outputting the current (Yes in the step S408). The failure determination portion 16 determines that the abnormality of the second power line 32 has been detected (the step S409). The failure determination portion 16 records the abnormality of the second power line 32 into the status data 60. When the failure determination portion 16 has detected the abnormality of the second power line 32, the switch control portion 17 outputs a control signal 1S instructing OFF of the switch 4 to the switch 4 (the step S410). Due to the OFF of the switch 4, connection between the main battery 21 and the backup battery 31 is cut off.

Since the processing of the steep S410 is the same as the step S310 shown in FIG. 12, description thereof will be omitted.

As described above, when both the first failure condition based on the temporal change of the SOC value 51 of the backup battery 31 and the second failure condition based on the current flowing into the main battery 21 are satisfied, the power source control unit 1 determines that the main battery 21 failed. Thus, the power source control unit 1 can determine whether the main battery 21 failed or not with high accuracy.

4. Modifications

An example in which the power supply system 100 is provided with the power generator 2 and the converter 3 has been described in the aforementioned embodiment. However, the present invention is not limited thereto. The power supply system 100 does not have to be provided with the power generator 2 and the converter 3. In this case, the current sensor 25 measures the current flowing through the section between the main battery 21 and the connection portion 24 in the first power line 22.

An example in which determination is made that the main battery 21 failed when both the first failure condition and the second failure condition are satisfied has been described in the aforementioned embodiment. However, the present invention is not limited thereto. The power source control unit 1 may determine that the main battery 21 failed when at least one of the first failure condition and the second failure condition is satisfied.

In addition, the power source control unit 1 may change a condition for determining that the main battery 21 failed, in accordance with a state of a driver of the mobile body mounted with the power supply system 100. When, for example, the mobile body is a car, the power source control unit 1 can change the condition based on whether the driver is holding the steering wheel or not.

When the driver is not holding the steering wheel, the power source control unit 1 sets the thing that at least one of the first failure condition and the second failure condition is satisfied, as the condition for determining that the main battery 21 failed. In this case, the driver cannot immediately drive the car if the automatic driving is cancelled. Since the main battery 21 and the backup battery 31 are prevented from simultaneously failing, a continuous state of the automatic driving of the car can be maintained. When the driver is holding the steering wheel, the power source control unit 1 sets the thing that both the first failure condition and the second failure condition are satisfied, as the condition for determining that the main battery 21 failed. This is because the driver can immediately start driving the car even if the automatic driving is cancelled in this case.

An example in which the power source control unit 1 determines whether the main battery 21 failed or not has been described in the aforementioned embodiment. However, the present invention is not limited thereto. The power source control unit 1 may determine whether the backup battery 31 failed or not.

An example in which the power source control unit 1 determines whether the first system load 23 and the second system load 33 failed or not has been described in the aforementioned embodiment. However, the present invention is not limited thereto. The power source control unit 1 may not detect the failure of the first system load 23 and the second system load 33. The power source control unit 1 may not detect whether abnormality occurred in the first power line 22 and the second power line 32 or not.

An example in which the power source control unit 1 determines whether the main battery 21 failed or not, based on whether the current is flowing from the first system load 23 into the main battery 21 or not has been described in the aforementioned embodiment. The power source control unit 1 may determine whether the backup battery 31 failed or not, based on whether the current is flowing from the second system load 33 into the backup battery 31 or not.

Specifically, the power source control unit 1 may determine that the backup battery 31 failed when the current measurement value I35 received from the current sensor 35 indicates the flow of the current into the backup battery 31, and the load current value 136 received from the current sensor 36 indicates the supply of the current by the second system load 33.

An example in which the general load 232 receives the supply of the power from the converter 3 through the first power line 22 has been described in the aforementioned embodiment. However, the present invention is not limited thereto. The general load 232 may directly receive the supply of the power from the converter 3.

An example in which the power supply system 100 is mounted on the mobile body has been described in the aforementioned embodiment. However, the apparatus mounted with the power supply system 100 is not limited to the mobile body.

In addition, each of the functional blocks of the power source control unit 1 may be formed as one individual chip by a semiconductor device such as an LSI, or one chip may be formed to include some or all of the functional blocks of the power source control unit 1. The semiconductor device is regarded as the LSI here. However, according to the degree of integration, the semiconductor device may be referred to as IC, system LSI, super LSI, or ultra LSI.

The method for forming the functional block as an integrated circuit is not limited to the LSI but may be achieved by a dedicated circuit or a general-purpose processor. An FPGA (Field Programmable Gate Array) which can be programmed after an LSI is manufactured or a reconfigurable processor where connection or setting of circuit cells inside the LSI can be reconfigured after the LSI is manufactured may be used.

In addition, the processings executed by the power source control unit 1 may be partially or entirely implemented by programs. The processings of the functional blocks in the aforementioned embodiment can be partially or entirely performed by a central processing unit (CPU) in a computer. In addition, the programs for performing the processings are stored in a storage device such as a hard disk or an ROM, and executed in the ROM or read out and executed in an RAM.

In addition, the processings in the aforementioned embodiment may be implemented by hardware or may be implemented by software (including an OS (Operating System), middleware, or a case where the software is implemented together with a predetermined library). Further, the processings may be implemented by mixed processing of software and hardware.

Figure 15:
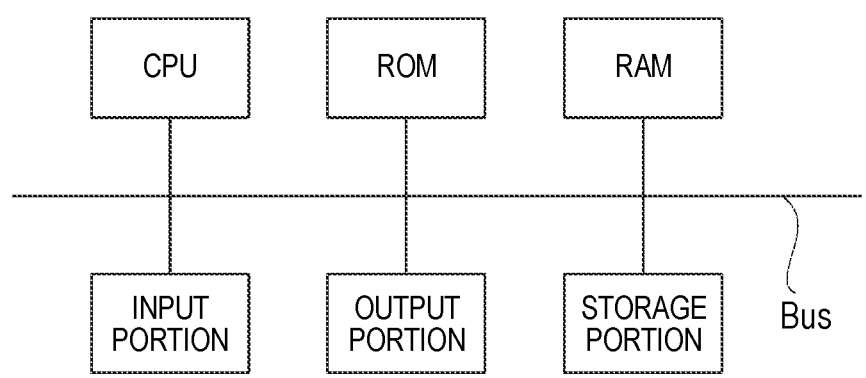
FIG. 15 is a diagram showing the configuration of a bus for a CPU.

When, for example, the functional blocks of the power source control unit 1 are implemented by software, the functional portions may be implemented by software processing by use of a hardware configuration shown in FIG. 15 (e.g. a hardware configuration in which a CPU, an ROM, an RAM, an input portion, an output portion, etc. are connected by a bus Bus).

In addition, an execution sequence of the processing method in the aforementioned embodiment is not limited to the description of the aforementioned embodiment. However, the execution sequence may be changed without departing from the gist of the invention.

A computer program allowing a computer to execute the aforementioned method and a computer-readable recording medium into which the program has been recorded are included in the scope of the present invention. Here, a flexible disk, a hard disk, a CD-ROM, an MO, a DVD, a DVD-ROM, a DVD-RAM, a large-capacity DVD, a next-generation DVD, and a semiconductor memory can be listed as examples of the computer-readable recording medium.

Although the embodiment of the present invention has been described above, the aforementioned embodiment is merely an example for carrying out the present invention. Accordingly, the present invention is not limited to the aforementioned embodiment, but the aforementioned embodiment can be suitably modified and carried out without departing from the spirit of the present invention.

REFERENCE SIGNS LIST

100 power supply system
1 power source control unit
21 main battery
22 first power line
23 first system load
31 backup battery
32 second power line
33 second system load
11 SOC acquisition portion
12 first SOC determination portion
13 second SOC determination portion
14 current acquisition portion
15 current determination portion
16 failure determination portion
17 switch control portion

The invention claimed is:

1. A power source control unit for controlling a switch that makes connection between a first power line and a second power line, a first system load being connected to a first power source through the first power line, a second system load being connected to a second power source through the second power line, the power source control unit comprising:
 a processor configured to:
  acquire a power source current value from a current sensor that measures a current flowing through a section between the first power source and a first connection portion in the first power line, the first connection portion connecting the first power line to a wiring connected to the switch;
  determine whether the second power source is supplying a current to the first power source or not, based on the power source current value;
  determine that the first power source is grounded when a determination is made that the second power source is supplying the current to the first power source;
  turn the switch off when a determination is made that the first power source is grounded;
  acquire a state of charge value of the second power source;
  compare the state of charge value with a first threshold so as to determine whether the second power source can supply predetermined power to the second system load for a predetermined time or not;
  determine whether the state of charge value has decreased to be lower than a second threshold or not when a determination is made that the second power source can supply the predetermined power to the second system load for the predetermined time, the second threshold being higher than the first threshold;
  determine that the first power source failed when a determination is made that the state of charge value is lower than the second threshold; and
 turn the switch off when a determination is made that the first power source failed.

2. The power source control unit according to claim 1, wherein the processor is further configured to:
 acquire a first load current value from a current sensor which measures a current flowing through a section between the first connection portion and the first system load in the first power line;
 determine whether the current is being supplied to the first system load or not, based on the first load current value, and determines whether the first load current value is higher than a third threshold or not;
 determine that the first system load failed when a determination is made that the current is being supplied to the first system load and the first load current value is higher than the third threshold; and turn the switch off when a determination is made that the first system load failed.

3. The power source control unit according to claim 2, wherein the processor is further configured to:
   determine whether the first system load is outputting a current to the first power line, based on the first load current value;
   determine that an abnormality occurred in the first power line when a determination is made that the first system load is supplying the current to the first power line; and
   turn the switch off when a determination is made that the abnormality occurred in the first power line.

4. The power source control unit according to claim 1, wherein the processor is further configured to:
   acquire a second load current value from a current sensor that measures a current flowing through a section between the second system load and a second connection portion in the second power line, the second connection portion connecting the second power line to a wiring connected to the switch;
   determine whether the current is being supplied to the second system load or not, based on the second load current value, and determine whether the second load current value is higher than a fourth threshold or not;
   determine that the second system load failed when a determination is made that the current is being supplied to the second system load and the second load current value is higher than the fourth threshold; and
   turn the switch off when a determination is made that the second system load failed.

5. The power source control unit according to claim 4, wherein the processor is further configured to:
   determine whether the second system load is outputting a current to the second power line or not, based on the second load current value;
   determine that an abnormality occurred in the second power line when a determination is made that the second system load is outputting the current to the second power line; and
   turn the switch off when a determination is made that the abnormality occurred in the second power line.

6. A power source control method for controlling a switch that makes connection between a first power line and a second power line, a first system load being connected to a first power source through the first power line, a second system load being connected to a second power source through the second power line, the method comprising:
   acquiring a power source current value from a current sensor that measures a current flowing through a section between the first power source and a first connection portion in the first power line, the first connection portion connecting the first power line to a wiring connected to the switch;
   determining whether the second power source is supplying a current to the first power source or not, based on the power source current value;
   determining that the first power source is grounded when a determination is made that the second power source is supplying the current to the first power source;
   turning the switch off when a determination is made that the first power source is grounded;
   acquiring a state of charge value of the second power source;
   comparing the state of charge value with a first threshold so as to determine whether the second power source can supply predetermined power to the second system load for a predetermined time or not;
   determining whether the state of charge value has decreased to be lower than a second threshold or not when a determination is made that the second power source can supply the predetermined power to the second system load for the predetermined time, the second threshold being higher than the first threshold;
   determining that the first power source failed when a determination is made that the state of charge value is lower than the second threshold; and
   turning the switch off when a determination is made that the first power source failed.

* * * * *